(12) United States Patent
Lopez et al.

(10) Patent No.: US 9,150,763 B2
(45) Date of Patent: Oct. 6, 2015

(54) ADHESIVE POLYMERS FOR FORMING LAMINATE STRUCTURES

(75) Inventors: Leonardo C. Lopez, Midland, MI (US); Alveda J. Williams, Pearland, TX (US); William J. Harris, Lake Jackson, TX (US)

(73) Assignee: Dow Global Technologies LLC

( * ) Notice: Subject to any disclaimer, the term of this patent is extended or adjusted under 35 U.S.C. 154(b) by 1086 days.

(21) Appl. No.: 12/527,893

(22) PCT Filed: Mar. 13, 2008

(86) PCT No.: PCT/US2008/056755
§ 371 (c)(1),
(2), (4) Date: Aug. 20, 2009

(87) PCT Pub. No.: WO2008/112834
PCT Pub. Date: Sep. 18, 2008

(65) Prior Publication Data
US 2010/0119832 A1     May 13, 2010

Related U.S. Application Data

(60) Provisional application No. 60/918,012, filed on Mar. 14, 2007.

(51) Int. Cl.
| C09J 175/06 | (2006.01) |
| B32B 7/12 | (2006.01) |
| B32B 17/10 | (2006.01) |
| B32B 27/08 | (2006.01) |
| C09J 177/12 | (2006.01) |

(52) U.S. Cl.
CPC .................. *C09J 175/06* (2013.01); *B32B 7/12* (2013.01); *B32B 17/10036* (2013.01); *B32B 17/10779* (2013.01); *B32B 27/08* (2013.01); *C09J 177/12* (2013.01); *Y10T 428/3175* (2015.04); *Y10T 428/31507* (2015.04); *Y10T 428/31551* (2015.04); *Y10T 428/31562* (2015.04); *Y10T 428/31573* (2015.04); *Y10T 428/31601* (2015.04); *Y10T 428/31623* (2015.04); *Y10T 428/31725* (2015.04); *Y10T 428/31736* (2015.04)

(58) Field of Classification Search
CPC .................. B32B 17/10036; B32B 17/10779; B32B 27/08; B32B 7/12; C09J 175/06; C09J 177/12; Y10T 428/31507; Y10T 428/31551; Y10T 428/31562; Y10T 428/31573; Y10T 428/31601; Y10T 428/31623; Y10T 428/31725; Y10T 428/31736; Y10T 428/3175
See application file for complete search history.

(56) References Cited

U.S. PATENT DOCUMENTS

| 2,236,046 A | * | 3/1941 | Watkins | 156/99 |
| 2,319,534 A | * | 5/1943 | Crowley | 428/46 |
| 3,025,323 A | | 3/1962 | Rose et al. | |
| 3,650,999 A | * | 3/1972 | Ashley et al. | 428/423.1 |
| 4,010,311 A | * | 3/1977 | Lewis et al. | 428/412 |
| 4,081,581 A | | 3/1978 | Littell, Jr. et al. | |
| 4,277,538 A | | 7/1981 | Beckmann et al. | |
| 4,725,488 A | * | 2/1988 | Swan et al. | 442/232 |
| 5,547,736 A | | 8/1996 | Simon et al. | |
| 6,172,167 B1 | | 1/2001 | Stapert et al. | |
| 2001/0008695 A1 | | 7/2001 | Bolton et al. | |
| 2005/0106398 A1 | | 5/2005 | Moran et al. | |

FOREIGN PATENT DOCUMENTS

| EP | 0563040 | 6/1995 |
| EP | 0710545 | 5/1996 |
| EP | 1604815 | 12/2005 |
| WO | 84/04490 | 11/1984 |
| WO | 92/07715 | 5/1992 |
| WO | 92/11135 | 7/1992 |
| WO | 92/11137 | 7/1992 |
| WO | 95/19261 | 7/1995 |
| WO | 96/28504 | 9/1996 |
| WO | 98/00454 | 1/1998 |
| WO | WO 2007/030791 A | * 3/2007 |

OTHER PUBLICATIONS

"Supramolecular Polymers" Alberto Ciferri Ed., 2nd Edition, pp. 157-158, CRC Press.
Corbin et al., "Chapter 6 Hydrogen-Bonded Supramolecular Polymers: Linear and Network Polymers and Self Assembling Discotic Polymers", Supramolecular Polymers, 2005, 153-182, 2nd Edition, CRC Press.
Jetter et al., "Long-chain alkanediols from Myricaria germanica leaf cuticular waxes", Phytochemistry, 2000, pp. 169-176, vol. 55, Elsevier Science Ltd.
S. Katayama et al. "Synthesis of Alternating Polyamideurethans by Reacting Diisocyanates with N,N'-Di-(6-hydroxycaproyl)alkylenediamines and N-hydroxy-alkyl-6-hydroxycaproamide", Journal of Applied Polymer Science, 1971, pp. 775-796, vol. 15, John Wiley & Sons, Inc.
Koevoets et al., "Molecular Recognition in a Thermoplastic Elastomer", Journal of the American Chemical Society, 2005, 2999-3003, vol. 127, No. 9, American Chemical Society.
Lips et al., "Incorporation of different crystallizable amide blocks in segmented poly(ester amide)s", Polymer, 2005, 7834-7842, vol. 46, Elsevier Ltd.
Lips et al., "Synthesis and characterization of poly(ester amide)s containing crystallizable amide segments", Polymer, 2005, 7823-7833, vol. 46, Elsevier Ltd.

* cited by examiner

*Primary Examiner* — Callie Shosho
*Assistant Examiner* — John Freeman

(57) ABSTRACT

Laminate structures comprising one or more sheets of material bonded together with an adhesive polymer. The adhesive polymer is a polyester amide, polyester urethane, or polyester urea.

14 Claims, 5 Drawing Sheets

ADHESIVE POLYMERS FOR FORMING LAMINATE STRUCTURES

CROSS-REFERENCE TO RELATED APPLICATIONS

This is a §371 application from PCT International Application Number PCT/US2008/056755, filed Mar. 13, 2008, which claims benefit from U.S. Provisional Application No. 60/918,012, filed Mar. 14, 2007, the contents of both of which are incorporated herein by reference.

FIELD OF THE INVENTION

The invention relates to laminate structures, such as glass laminates, in which a self-assembling polymer is used as a coating layer or an interlayer adhesive.

BACKGROUND OF THE INVENTION

Glass laminates utilized in the automotive, architectural, residential, institutional, decorative, safety and security industries are mostly assembled with poly(vinyl butyral) ("PVB") adhesive films. Laminated glass is a high cost product in part because of the costs associated with PVB, complex processes required to laminate and careful transport and storage required due to low thermal properties and moisture sensitivity of PVB.

PVB absorbs water, loses plasticizers, reacts with glass adhesives and is only available in sheet form. Furthermore, plasticized PVB sheet tends to stick to itself (sometimes called "blocking") at ambient temperatures typically encountered during storage before laminating and expensive precautions have been taken to prevent this. Many complexities, therefore, are encountered in the transportation and application of PVB for lamination.

Consequently, a need exists for simplification of the above issues by materials with better properties that are compatible with easier application processes. Such materials would constitute a significant breakthrough and improvement of the cost/performance ratio in laminated glass products and other laminates.

BRIEF SUMMARY OF THE INVENTION

The invention provides, for example, adhesive polymers for glass laminates that overcome the disadvantages of previously known systems, including the transportation, storage, and application issues associated with PVB.

In one aspect, therefore, the invention provides a laminate structure comprising two or more sheets of material bonded together with an adhesive polymer, which is disposed (i.e., in a layer, preferably a continuous layer) between adjacent sheets of material. The adhesive polymer comprises a poly (ester amide), poly(ester urethane), or poly(ester urea) (i.e., the adhesive polymer comprises ester linkages and either amide linkages, urethane linkages, or urea linkages, respectively, in its backbone) that is a self assembling material. Each sheet of material independently is glass; polycarbonate; acrylic polymer; acrylic copolymer; polyolefin; polyester that is poly(butylene terephthalate), poly(trimethylene terephthalate) poly(ethylene naphthalate), or cyclohexanedimethanol-modified poly(ethylene terephthalate); polylactide; polycaprolactone; polyhydroxyester; polyhydroxyester copolymer; halogenated polymer; polystyrene; polyurethane; or neoprene. In another aspect, the invention provides a laminate structure consisting essentially of one sheet of material, which is as described above, substantially coated with an adhesive polymer, which is as described above. In laminate structures comprising three or more sheets, and thus comprising two or more layers of adhesive polymer, each layer of adhesive polymer is independently selected.

DETAILED DESCRIPTION OF THE INVENTION

Figure 1:
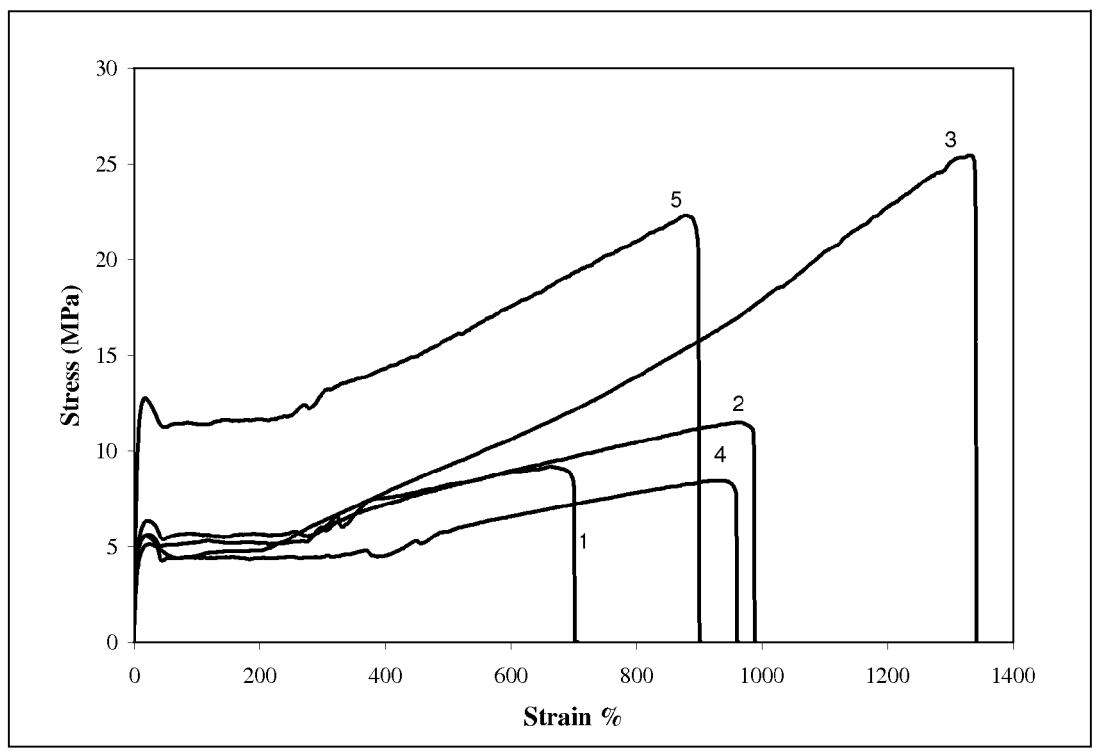
FIG. 1 is a plot comparing microtensile strength of polymers useful in the present invention compared to PVB.

In one aspect, the invention provides a laminated structure, preferably glass laminates. The sheets of material that form the laminate are bonded together with a polymer or oligomer adhesive that is a macromolecular self-assembling polymer or oligomer.

Macromolecular self assembling ("MSA") materials, such as poly(ester amides), provide the high level of adhesion and mechanical performance required of laminates such as glass laminates. The MSA materials (i.e., adhesive polymers) useful in the present invention typically have additional beneficial properties. For example, the MSA materials may form a transparent or translucent layer and thus are useful in invention laminate structures (e.g., glass laminate structures and other laminate structures comprising windows) where transparent or translucent optical properties (e.g., windows) are desirably, as well as in invention laminate structures wherein such optical properties are unimportant (e.g., automobile interior systems and components of home appliance assemblies other than windows). Further, the MSA materials typically impart impact toughness to the invention laminate structures, as determined with standard impact testing (see Examples below), and thus invention laminate structures are useful in durable applications.

The compositional flexibility of the MSA materials allows tailoring of performance to specific requirements of various laminate applications. Furthermore, this flexibility provides the means to obtain materials that avoid the issues of careful transportation that incumbent materials (e.g., PVB) have due to the low thermal performance of incumbent materials. In addition, one important characteristic of the MSA based materials, their low melt viscosity, allows a simpler lamination process under reduced temperature and pressure than required by incumbent materials.

Macromolecular self assembling polymers or oligomers useful in the present invention are polyester-amides, polyester-urethanes, polyester-ureas, and mixtures thereof that possess characteristics of a self assembling material. By "self-assembling material" is meant an oligomer or polymer that forms a larger oligomer or polymer through the physical intermolecular association, such as hydrogen bonding, of functional groups in the material.

The (macromolecular) self-assembling materials for use in the invention are oligomers or polymers that effectively form larger oligomers or polymers, upon a triggering event, through the physical intermolecular association of functional groups in the material. The materials contain functional groups capable of strong directional interactions, such as (a) electrostatic interactions (ion-ion, ion-dipole or dipole-dipole) or coordinative bonding (metal-ligand), (b) hydrogen bonding, (c) π-π stacking interactions, and/or (d) van der Waals forces. The preferred materials assemble upon cooling from the melt state and form supramolecular structures whose mechanical properties mimic to a useful degree, at end use temperatures, the advantageous physical properties of higher molecular weight or even cross-linked polymers.

Figure 5:
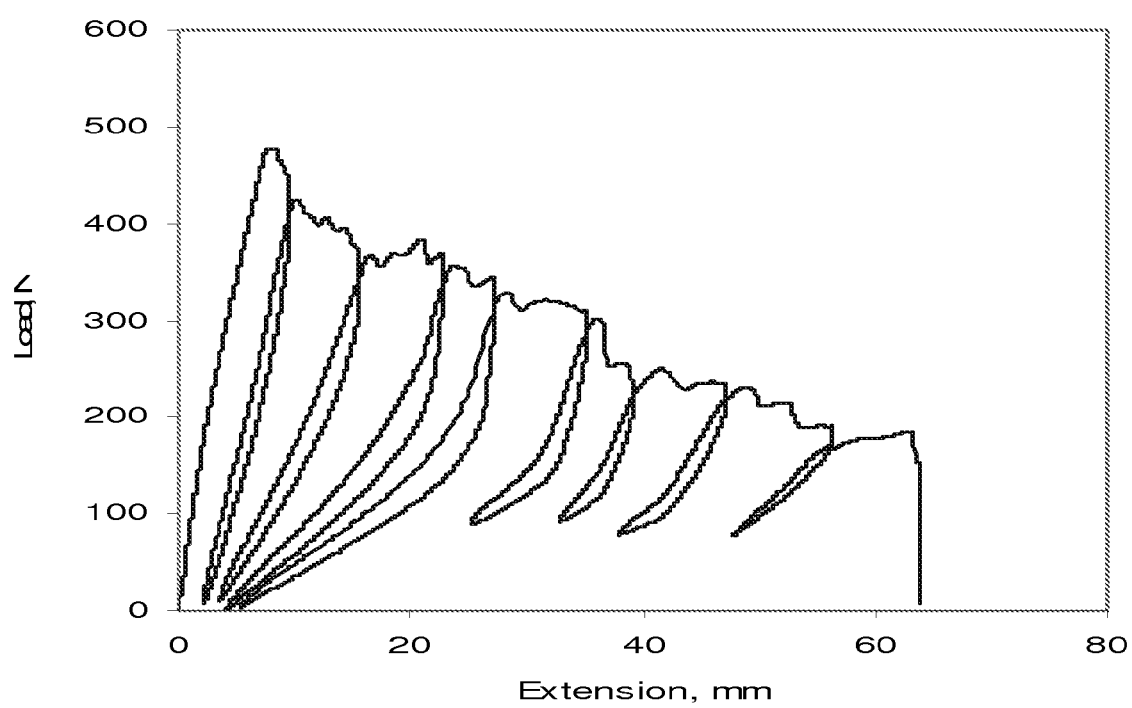
FIG. 5 is a plot of load versus extension data from a test of Interlaminar fracture toughness of another sample on polycarbonate of the polyester amide polymer useful in the present invention mentioned for FIG. 4.

Association of multiple-hydrogen-bonding arrays is the preferred mode of self assembly. A description of self assembling multiple H-bonding arrays can be found in "Supramolecular Polymers" Alberto Ciferri Ed., 2nd Edition, pages (pp) 157-158. The extent of self assembly or the strength of interaction is measured by the association constant K(assoc). K(assoc) may range from $10^2$ to $10^9$ reciprocal molarity ($M^{-1}$) (ibid. p 159, reference FIG. 5).

Thus, in preferred aspects, the self-assembling material for use in the invention comprises self assembling units that themselves comprise multiple hydrogen bonding arrays. Preferably, the multiple hydrogen bonding arrays have an association constant K(assoc) of greater than $10^3$ $M^{-1}$. Also preferably, the multiple H-bonding arrays comprise an average of 2 to 8, preferably 4-6, more preferably greater than 4, donor-acceptor hydrogen bonding sites per self assembling unit.

Preferably, the glass transition temperature of the materials is less than 20 degrees Celsius. Preferably, the melting point is higher than 50 degrees Celsius. Embodiments according to the present invention can exhibit multiple $T_g$, glass transition temperatures. In a preferred embodiment, the self assembling material has a glass transition temperature $T_g$ that is higher than −80° C., and in another preferred embodiment, a glass transition temperature is higher than 60° C.

As used herein, the term viscosity means zero shear viscosity unless specified otherwise. The term "Tm" means melting point as determined by techniques known in the art such as differential scanning calorimetry.

The Tensile modulus of one preferred group of self assembling materials useful in the invention is preferably from 15 megapascals (MPa) to 500 MPa at room temperature, preferably 20 degrees Celsius (° C.). Tensile modulus testing is well known in the polymer arts.

Preferably, polydispersities of substantially linear self-assembling materials are 4 or less, more preferably 3 or less, still more preferably 2.5 or less, still more preferably 2.2 or less.

For convenience and unless otherwise noted, the adhesive macromolecular self assembling polymer or oligomer useful in the present invention may be referred to herein as a "polymer" instead of "polymer or oligomer."

In one embodiment (embodiment I-1), the macromolecular self assembling polymer adhesive of the invention comprises a first repeat unit represented by the formula —[H1-AA]- and a second repeat unit represented by the formula -[DV-AA]-, where H1 is —R—CO—NH—Ra—NH—CO—R—O— or —R—NH—CO—R—CO—NH—R—O— where Ra is R or a bond (i.e., "—Ra—" is a bond), R is independently in each occurrence an aliphatic or heteroaliphatic, alicyclic or heteroalicyclic or aromatic or heteroaromatic group, preferably R is an aliphatic group of 1 to 10, preferably 1-6 carbon atoms and each AA independently is a —CO—R'—CO—O— where R' is a bond (i.e., "—R'—" is a bond) or an aliphatic group, preferably of 1 to 10, more preferably 2-6 carbon atoms, where DV is —[R"—O]— and R' is an aliphatic or heteroaliphatic, alicyclic or heteroalicyclic or aromatic or heteroaromatic group. Preferably, R" is selected such that R"(OH)$_2$ can be distilled off (preferably at ambient pressure or below) from the reaction mixture in subsequent derivation of the polymer. Preferably, R" is an aliphatic group of 1 to 8, more preferably 1 to 7 carbon atoms, still more preferably 2 to 6 carbon atoms. When R" is an aliphatic group of 1 to 7 carbon atoms, R"(OH)$_2$ is a volatile diol.

According to one representation, the polymer of embodiment I-1 may be represented as having the formula HO-D1-O—[—CO-AA1-O-D1-O—]x[CO-AA1-CO—O-AD-O]y-H, wherein paired brackets contain respective x and y repeat units; O-D1-O represents the residual of a volatile diol functionality, wherein CO-AA1-CO represents the residual of an aliphatic dicarboxylic acid functionality (preferably short e.g. 6 or fewer carbon atoms), and O-AD-O represents a residual of a preferably short (e.g. preferably 6 or fewer carbon atoms in the diamine) symmetrical, crystallizing amide diol functionality, wherein each x and y independently is an integer of 1 or higher that represents the number of one of the respective x and y repeat units.

In a second embodiment (embodiment I-2), the polymer comprises repeat units —[H1-AA]-, -[DV-AA]-, and -[D2-O-AA]-, where H1, AA, and DV are as defined above for embodiment I-1 and D2 is independently in each occurrence an aliphatic or heteroaliphatic, alicyclic or heteroalicyclic or aromatic or heteroaromatic group, and preferably D2 is an aliphatic group.

According to one representation, the polymer of embodiment I-2 may be represented as having the formula HO-D2-O—[—CO-AA1-CO—O-D1,D2-O-]x-[CO-AA1-CO—O-AD-O]y-H, wherein paired brackets contain respective x and y repeat units, wherein O-D2-O represents a residual nonvolatile diol functionality, wherein CO-AA1-CO represents the residual of the aliphatic dicarboxylic acid functionality, wherein O-AD-O represents the residual of the polyamide diol functionality, wherein O-D1,D2-O (i.e., O-D1-O or O-D2-O, respectively) represents the residual of the volatile diol functionality or the nonvolatile diol functionality, wherein each x and y independently is an integer of 1 or higher that represents the number of one of the respective x and y repeat units in the polymer. Nonvolatile diols are defined in this specification as having a molecular weight greater than the molecular weight of 1,7 heptane diol, i.e., greater than 132 grams per mole (g/mol).

In a third embodiment (embodiment I-3), the polymer comprises repeat units —[H1-AA]-, —[R—O-AA]-, and -M-(AA)$_n$-, wherein H1, AA, and R are as defined above for embodiment I-1 and M is an n valent organic moiety, preferably aliphatic or heteroaliphatic, alicyclic or heteroalicyclic or aromatic or heteroaromatic group, preferably having up to 20 carbon atoms, and n is an integer of 3 or more.

According to one representation (with a single polyfunctional moiety M built in the chain, though a plurality of M is possible) the polymer of embodiment I-3 may have the formula HO-D1-O—[—CO-AA1-CO—O-D1-O-]x-[CO-AA1-CO—O-AD-O]y-CO-AA1-CO—O-M-(O—[CO-AA1-CO—O-D1-O]x'-[CO-AA1-CO—O-AD-O]y'-H)$_{n-1}$, wherein paired brackets contain respective x, x', y and y' repeat units, wherein O-D1-O represents the residual of the volatile diol functionality, wherein CO-AA1-CO represents the residual of the aliphatic dicarboxylic acid functionality, wherein O-AD-O represents the residual of the polyamide diol functionality, wherein each x, x', y and y' independently is an integer of 0 or higher that represents the number of one of the respective x, x', y and y' repeat units in the polymer and at least x or x' is 1 or higher and at least y or y' is 1 or higher.

In another embodiment (embodiment I-4), the polymer comprises repeat units —[H1-AA]-, —[R—O-AA]-, and -PA-(CO—O—R—O)$_n$—, wherein H1, AA, and R are as defined above for embodiment I-1 and PA is an n valent organic moiety, preferably aliphatic or heteroaliphatic, alicyclic or heteroalicyclic or aromatic or heteroaromatic group, preferably having up to 20 carbon atoms, and n is an integer of 3 or more.

According to one representation (with a single polyfunctional moiety PA built in the chain, though a plurality of PA is possible) the polymer of embodiment I-4 may have the formula HO-D1-O—[—CO-AA1-CO—O-D1-O-]x-[CO-AA1-CO—O-AD-O]y-CO-PA-(CO—O-D1-O—[CO-AA1-CO—O-D1-O]x'-[CO-AA1-CO—O-AD-O]y'-H)$_{n-1}$, wherein paired brackets contain respective x, x', y, and y' repeat units, wherein O-D1-O represents the residual of the volatile diol functionality, wherein CO-AA1-CO represents the residual of the aliphatic dicarboxylic acid functionality, wherein O-AD-O represents the residual of the polyamide diol functionality, wherein each x, x', y, and y' independently is an integer of 0 or higher that represents the number of one of the respective x, x', y, and y' repeat units in the polymer and at least x or x' is 1 or higher and at least y or y' is 1 or higher.

In another embodiment (embodiment I-5), the polymer comprises repeat units —[H2-D]-, —[R—O-AA]-, and -M-(AA)$_n$-, where M-(AA) is as defined above for embodiment I-3, where H2 is —CO—R—CO—NH—R—NH—CO—R—CO—O— where R is independently in each occurrence an aliphatic or heteroaliphatic, alicyclic or heteroalicyclic or aromatic or heteroaromatic group, preferably R is an aliphatic group of 1 to 10, preferably 2-4 carbon atoms and where D is —[R—O]— and R is a an aliphatic or heteroaliphatic, alicyclic or heteroalicyclic or aromatic or heteroaromatic group.

According to one representation, the polymer of embodiment I-5 may be represented by the formula (with a single polyfunctional moiety M built in the chain, though a plurality of M is possible): H—[—O-D1-O—CO-AA1-CO—]x-[O-D1-O—CO-DD-CO-]y-O-M-(O—[CO-AA1-CO—O-D1-O]x'-[—CO-DD-CO—O-D1-O]y'-H)$_{n-1}$, wherein paired brackets contain respective x, x', y and y' repeat units, wherein O-D1-O represents the residual of the volatile diol functionality, wherein CO-AA1-CO represents residual of the aliphatic dicarboxylic acid functionality, wherein CO-DD-CO represents residual of the diamide diacid functionality, wherein each x, x', y and y' independently is an integer of 0 or higher that represents the number of one of the respective x, x', y and y' repeat units in the polymer and at least x or x' is 1 or higher and at least y or y' is 1 or higher.

In another embodiment (embodiment 1-6), the polymer comprises repeat units —[H2-AA]-, —[R—O-AA]-, and -PA-(COOR—O)n- where H2 is as defined above for embodiment I-5, R—O-AA is as defined above for embodiment 1-3, and PA-(COOR—O)$_n$ is as defined above for embodiment 1-4.

According to one representation of embodiment 1-6 (with a single polyfunctional moiety PA built in the chain, though a plurality of PA is possible) the polymer may be represented by the formula HO-D1-O—[—CO-AA1-CO—O-D1-O-]x-[CO-DD-CO—O-D1-O]y CO-PA-(CO—[—O-D1-O—CO-AA1-CO-]x'[O-D1-O—CO-DD-CO]y'-O-D1-OH)$_{n-1}$, wherein paired brackets contain respective x, x', y and y' repeat units, wherein O-D1-O represents the residual of the volatile diol functionality, wherein CO-AA1-CO represents residual of the aliphatic dicarboxylic acid functionality, wherein CO-DD-CO represents residual of the diamide diacid functionality, wherein each x, x', y and y' independently is an integer of 0 or higher that represents the number of one of the respective x, x', y and y' repeat units in the polymer and at least x or x' is 1 or higher and at least y or y' is 1 or higher.

In another embodiment (embodiment I-7), the polymer has the formula HO-D1-O—[—CO-AA1,AA2-CO—O-D1-O-]x-[CO-AA1,AA2-CO—O-AD-O]y-H, wherein paired brackets contain respective x and y repeat units, wherein O-D1-O represents the residual of the volatile diol functionality, wherein CO-AA1,AA2-CO respectively represents the residual of the aliphatic dicarboxylic acid functionality (CO-AA1-CO) or a high boiling point diacid ester functionality (CO-AA2-CO), wherein O-AD-O represents the residual of the polyamide diol functionality, wherein each x and y independently is an integer of 1 or higher that represents the number of one of the respective x and y repeat units.

In another embodiment (embodiment I-8), the polymer comprises repeat units —[H2-D]-, —[H2-D2-O]—, [D-AA]- (preferably, -[DV-AA]-), and -[D2-O-AA]- wherein H2 is as defined above for embodiment I-5, D is as defined above for embodiment I-5; AA is as defined above for embodiment I-1, DV-AA is as defined above for embodiment I-1, and D2-O-AA is as defined above for embodiment I-2.

According to one representation the transformed polymer of embodiment I-8 may be represented by the formula HO-D2-O—[—CO-AA1-CO—O-D1,D2-O-]x-[—CO-DD-CO—O-D1,D2-O-]y-H, wherein paired brackets contain respective x and y repeat units, wherein O-D2-O represents the residual of the nonvolatile diol functionality, wherein CO-AA1-CO represents the residual of the aliphatic dicarboxylic acid functionality, wherein CO-DD-CO represents the residual of the diamide diacid functionality, wherein O-D1,D2-O respectively represents the residual of the volatile diol functionality or the nonvolatile diol functionality, wherein each x and y independently is an integer of 1 or higher that represents the number of one of the respective x and y repeat units in the polymer.

In yet another embodiment (embodiment I-9), the polymer is of the formula HO-D1-O—[—CO-AA1,AA2-CO—O-D1-O-]x-[CO-DD-CO—O-D1-O]y-OH, wherein paired brackets contain respective x and y repeat units, wherein O-D1-O represents the residual of the volatile diol functionality, wherein CO-AA1,AA2-CO respectively represents residual of the aliphatic dicarboxylic acid functionality or the high boiling point diacid ester functionality, wherein CO-DD-CO represents residual of the diamide diacid functionality, wherein each x and y independently is an integer of 1 or higher that represents the number of one of the respective x and y repeat units in the polymer.

In a preferred embodiment (embodiment II), the polymer is a poly(ester-amide) comprising the formula:

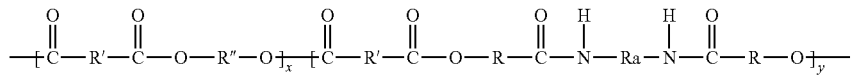

wherein paired brackets contain respective x and y repeat units, wherein each x and y independently is an integer of 1 or higher that represents the number of one of the respective x and y repeat units in the polymer, provided that neither x nor y is zero;

R is independently in each occurrence an aliphatic or heteroaliphatic, alicyclic or heteroalicyclic or aromatic or heteroaromatic group, preferably R is an aliphatic group of 2 to 14, preferably 3-5 carbon atoms, R' is a bond or at each occurrence is independently an aliphatic group, preferably of 1 to 12, more preferably 2-6 carbon atoms, R" is an aliphatic or heteroaliphatic, alicyclic or heteroalicyclic or aromatic or heteroaromatic group. Preferably, R' is an aliphatic group of 1 to 8, more preferably 1 to 7, still more preferably 2 to 6, carbon atoms; and Ra is a bond or is an aliphatic or heteroaliphatic, alicyclic or heteroalicyclic or aromatic or heteroaromatic group, preferably Ra is an aliphatic group of 1 to 10, preferably 2-4 carbon atoms.

The polymer of embodiment II preferably has a number average molecular weight ($M_n$) of at least about 2000 g/mol, and preferably no more than about 100,000 g/mol. More preferably, the molecular weight is at least about 4000 g/mol and no more than about 50,000 g/mol.

A preferred self-assembling material according to embodiment II is a polymer of formula II-1:

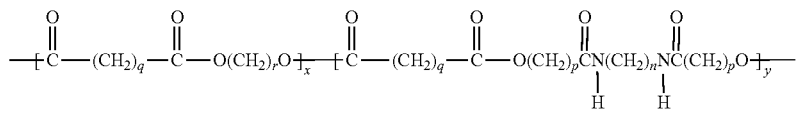

wherein p, q, and r are independently 2, 3, 4, 5, 6, 7, or 8; and n is an integer of 2-6.

In formula II-1, it is preferred that p, q, and r are independently 2, 4, 5, or 6. More preferably, q and r at each occurrence are 4. Also more preferably, p at each occurrence is 5. Also more preferably, n is 2.

A further preferred polymer according to embodiment II is a polymer of the formula II-2:

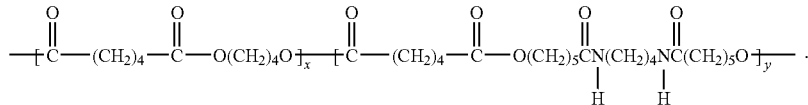

A still further preferred polymer according to embodiment II is a polymer of the formula II-3:

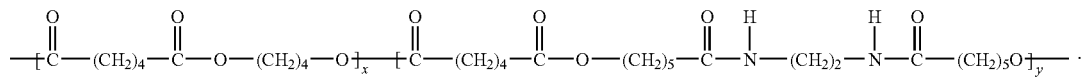

In a further preferred embodiment (embodiment III), the polymer is a poly(ester-amide) comprising the formula:

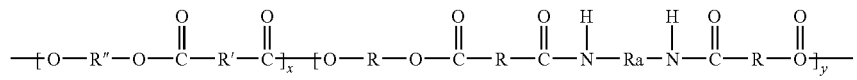

wherein paired brackets contain respective x and y repeat units, wherein each x and y independently is an integer of 1 or higher that represents the number of one of the respective x and y repeat units in the polymer, provided that neither x nor y is zero;

R is independently in each occurrence an aliphatic or heteroaliphatic, alicyclic or heteroalicyclic or aromatic or heteroaromatic group, preferably R is an aliphatic group of 1 to 10, preferably 1-6 carbon atoms, R' is a bond or an aliphatic or heteroaliphatic, alicyclic or heteroalicyclic or aromatic or heteroaromatic group. Preferably, R is an aliphatic group of 1 to 8, more preferably 2 to 6, carbon atoms;

R" is an aliphatic or heteroaliphatic, alicyclic or heteroalicyclic or aromatic or heteroaromatic group. Preferably, R' is an aliphatic group of 1 to 8, more preferably 1 to 7, still more preferably 2 to 6, carbon atoms; and Ra is an aliphatic or heteroaliphatic, alicyclic or heteroalicyclic or aromatic or heteroaromatic group, preferably Ra is an aliphatic group of 1 to 10, preferably 1-4 carbon atoms.

The polymer of embodiment III preferably has a number average molecular weight $M_n$ of at least about 2000 g/mol, and preferably no more than about 100,000 g/mol. More preferably, the $M_n$ is at least about 4000 g/mol and no more than about 50,000 g/mol.

A preferred self-assembling material according to embodiment III is a polymer of formula III-1:

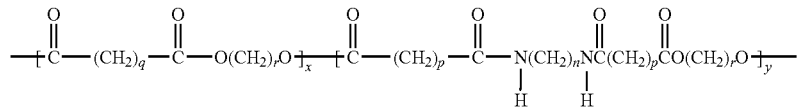

wherein p, q, and r are independently 2, 3, 4, 5, 6, 7, or 8; n is an integer of 2-6.

In formula III-1, it is preferred that p, q, and r are independently 2, 4, 5, or 6. More preferably, p, q and r at each occurrence are 4. Also more preferably, n is 4.

A further preferred polymer according to embodiment III is a polymer of the formula III-2:

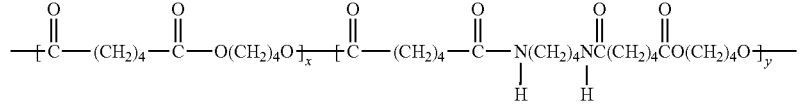

In yet another preferred embodiment (embodiment IV), the polymer is a poly(ester-urethane) comprising the formula:

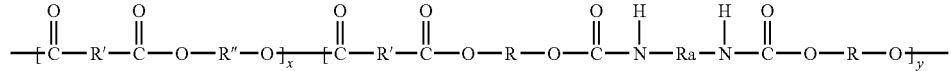

wherein paired brackets contain respective x and y repeat units;

wherein each x and y independently is an integer of 1 or higher that represents the number of one of the respective x and y repeat units in the polymer, provided that neither x nor y is zero;

R is independently at each occurrence an aliphatic or heteroaliphatic, alicyclic or heteroalicyclic or aromatic or heteroaromatic group, preferably R is an aliphatic group of 1 to 10, preferably 2-4 carbon atoms, R' is independently at each occurrence a bond or an aliphatic group, preferably of 1 to 10, more preferably 2-4 carbon atoms, R" is an aliphatic or heteroaliphatic, alicyclic or heteroalicyclic or aromatic or heteroaromatic group. Preferably, R" is an aliphatic group of 1 to 8, more preferably 1 to 7, still more preferably 2 to 4, carbon atoms; and Ra is a bond or is an aliphatic or heteroaliphatic, alicyclic or heteroalicyclic or aromatic or heteroaromatic group, preferably Ra is an aliphatic group of 1 to 12, preferably 2-6 carbon atoms.

The polymer of embodiment IV preferably has a number average molecular weight $M_n$ of at least about 2000 g/mol, and preferably no more than about 100,000 g/mol. More preferably, the $M_n$ is at least about 4000 g/mol and no more than about 50,000 g/mol.

For the polymers described above, it should be noted that, while for convenience the repeat units are as shown, the polymers are not necessarily strict block copolymers. Rather the polymers will have a statistical distribution of repeat units based on the starting materials, amounts, and/or order of addition. Further, in some of the formulas shown the oxygen in the repeat unit or portion of repeat units is drawn as occurring on one end of the repeat unit or portion of the repeat unit. However, the oxygen could have been shown on the other end of the repeat unit or portion of the repeat unit and still represented the same actual structure. The structures represent both variants.

Generally, each x, x', y and y' in the polymers independently represents the number of one of the indicated respective x, x', y, and y' repeat units, and at least x or x' is 1 or higher and at least y or y' is 1 or higher (i.e., there is at least an x or x' repeat unit and at least a y or y' repeat unit in the polymers).

Preferably, each of x, x', y and y' independently is 1 or higher. In embodiments having x and x', preferably x=x'. In embodiments having y and y', preferably y=y'. In embodiments having x, x', y and y', preferably x'=x and y'=y. In some embodiments, there are only x or x' and y or y' repeat units (or there are x, x', y and y' repeat units and x'=x and y'=y) and the molar ratio of moles of x (or x') units to moles of y (or y') units in the polymer is, respectively, between about 95:5 and about 5:95. In other embodiments, the ratio is between about 95:5 and about 50:50. In preferred embodiments, the ratio of moles of x units (or x') to moles of y units (or y') is at least about 50:50, at least about 70:30, or more preferably at least about 75:25 or about 72:18.

Except as explicitly stated elsewhere, the number average molecular weight $M_n$ of the adhesive polymers useful in the invention is preferably at least about 1000 g/mol, more preferably at least about 2000 g/mol, still more preferably at least about 4000 g/mol, even more preferably at least about 6000 g/mol, or further even more preferably at least about 8000 g/mol. The molecular weight of the polymers is preferably no more than about 100,000 g/mol, more preferably no more than about 75,000 g/mol, even more preferably no more than about 50,000 g/mol, still more preferably no more than about 30,000 g/mol, and even still more preferably no more than about 20,000 g/mol.

The polymers described above are used in the invention as adhesives for forming laminate structures, for example, laminates of glass, polycarbonate, acrylic polymers such as polyethylene-methacrylic acid or esters, polyolefin such as polyethylene; polyesters halogenated polymers such as fluorinated polymers, polyvinyl chloride; polystyrene; polyurethane; and neoprene, as well as laminates of combinations of the foregoing. Laminates of copolymers are also contemplated.

Preferably, each sheet of material comprising a laminate structure of the present invention independently is glass, polycarbonate, an acrylic polymer, acrylic copolymer, polyolefin, a polyester, polylactide, polycaprolactone, polyhydroxyester, polyhydroxyester copolymer, halogenated polymer, polystyrene; polyurethane; or neoprene. Preferred acrylic polymers are polymethylmethacrylate, polyethylene-methacrylic acids and polyethylene-methacrylic esters; a preferred polyolefin is polyethylene; preferred polyesters are poly(ethylene terephthalate) (PET) and, more preferably, cyclohexanedimethanol-modified PET, poly(butylene terephthalate), poly(trimethylene terephthalate) and poly(ethylene naphthalate); preferred polyhydoxyesters are polyhydroxybutyrate and polyhydroxyvalerate; preferred halogenated polymers are fluorinated polymers, including fluorinated ethylene-polymers (FEP), e.g., fluorinated polyethylene-propylene and polyvinylidene fluoride (PVDF)), and perfluoroalkoxy polymers (PFA), and chlorinated polymers, including polyvinyl chloride (PVC). It may be desirable to pre-treat (e.g., clean or roughen such as by sanding, etching or functionalizing via chemical or physical methods) surfaces of polymers to enhance adhesion of a self assembling material useful in the present invention thereto. Techniques to prepare polymer surfaces for adhesion are well known to the skilled in the art.

Preferably, the adhesive polymers useful in the present invention are used for forming laminates of glass, polycarbonate, PVC, PET, or combinations of these materials with each other. More preferably, the adhesive polymers are used for forming laminates of glass, polycarbonate, PVC, or combinations of these materials with each other. Further preferred are laminate structures in which at least one sheet of material is glass. Even more preferably, all the sheets of material are glass.

A laminate structure (also interchangeably referred to herein simply as laminate) according to the invention comprises at least two sheets of material with an adhesive polymer being disposed between the two sheets. The adhesive polymer thus forms a layer between the two sheets and independently adheres to each of the two sheets, thereby forming the laminate structure. The laminates may contain additional layers of material and adhesive polymer to provide multi-layered laminates (i.e., laminates of 2, 3, 4, or more sheets of materials bonded together with the adhesive polymers described herein). The term "sheet" means a shape having a depth that is thin relative to its length and width, i.e., a sheet does not mean a fiber or a particle. Preferably, multi-layered laminates contain no more than 500 sheets, more preferably no more than 250 sheets, still more preferably no more than 100 sheets, and even more preferably no more than 50 sheets.

Where a laminate structure of the invention consists essentially of one sheet of material and an adhesive polymer, the sheet of material has a surface and a substantial portion (i.e., at least 75%, preferably at least 90%) of area of the surface of the sheet of material is coated, preferably in a continuous layer, by the adhesive polymer.

Various processes may be used for forming the laminate structures. For instance, the polymer adhesive may be sandwiched between two sheets of material as a dry interlayer film or it may be applied by spray coating, spin coating, roll coating or blade coating. Such methods of lamination are well known in the art.

By way of illustration, one method to form a laminate structure with a sheet of dry interlayer film is as follows. In this method, films may be molded against fluorocarbon coated aluminum plates utilizing an approximately 0.76 mm thick chase with the following heating cycle:

1. Heat to 210 degrees Fahrenheit (° F.) (99 degrees Celsius (° C.)) and 5,000 pounds (lbs) (2,300 kilograms (kg)) of load and maintain under those condition for 5 minutes.
2. Maintain at 210° F. (99° C.) and increase pressure to 10,000 lbs (4,540 kg) for 10 minutes.
3. Cool film to 90° F. (32° C.) and 10,000 lbs (4,540 kg) at the maximum cooling rate of the press.

An embossing pattern may be added to the film.

Although, interlayer thickness is dependent on the intended application of the laminate structure, a final thickness of approximately between about 0.05 millimeters (mm) and about 5 mm, more preferably between about 0.5 mm and 2 mm, and more preferably about 0.7 mm, is suitable for many applications. Such film thicknesses can be utilized to make glass laminates and laminates of other materials.

As noted above, another method to make laminated structures is the spraying of the interlayer adhesive polymer onto the materials to be laminated. For example, the polymer can be sprayed from the melt onto the substrates to be laminated and the substrates can be bonded together by applying the appropriate temperature and pressure to form the laminated structure.

Other coating techniques or systems known in the art can be used for forming laminates. For example, blade coating; roll coating; meyer rod coating techniques systems may be utilized by supplying the molten material into the coating systems. Slot die coating or extrusion coating can also provide an effective avenue to deposit the laminating material on one or more substrates prior to assembling the laminated structure. Furthermore, in the case of thermoplastic substrates (polycarbonate, polyvinyl chloride, polyethylene terephthalate, etc.) a co-extrusion process may be utilized. In this case, the substrate and laminating material are extruded and deposited onto one another directly out of a die or dies to form a laminated structure.

Preferably, a laminate structure of the present invention is incorporated into an article comprising the laminate structure. More preferably, the article is a manufactured article, which means a finished good used in commerce or a component thereof. Examples of manufactured articles are an automobile (i.e., a finished good used in commerce) having a windshield comprised of a glass laminate structure of the present invention and the windshield per se (a component of the automobile). Preferred is an article comprising a glass laminate structure; a laminate structure comprising a polymer or copolymer, wherein the polymer or copolymer is polycarbonate, an acrylic polymer or copolymer, polyolefin, polyester that is a poly(butylene terephthalate), poly(trimethylene terephthalate) poly(ethylene naphthalate), or cyclohexanedimethanol-modified poly(ethylene terephthalate), halogenated polymer or copolymer, polystyrene, styrene/acrylonitrile/butadiene co-polymers, polyurethane, or neoprene; or a combination thereof. Preferred is an article wherein at least one sheet of material is glass. Also preferred is an article wherein two of the two or more sheets of material respectively are glass-glass, glass-polymer, or polymer-polymer. Regarding the article comprising glass-polymer, or polymer-polymer, preferably the polymer is polycarbonate or an acrylic polymer or copolymer.

More preferred is an article comprising a laminate structure of the present invention wherein the laminate structure comprises a vehicle windshield or a window (e.g., a building window, vehicle window, and appliance window). Examples of a laminate structure comprising a window are glass-glass laminate windows, polycarbonate-polycarbonate laminate windows, acrylic polymer-acrylic polymer laminate windows, acrylic copolymer-acrylic copolymer laminate windows, glass-polycarbonate laminate windows, glass-acrylic polymer laminate windows, and polycarbonate-acrylic copolymer laminate windows. Also more preferred is the article wherein the laminate structure comprises a synthetic glazing system. Examples of a synthetic glazing system are a window system (laminate) made out of polycarbonate or acrylic polymer without glass. Also more preferred is the article wherein the laminate structure comprises a display, a display case, an automotive interior system, or a home appliance assembly.

The adhesive polymers discussed above can be prepared as described in U.S. Pat. No. 6,172,167 and/or in international application number PCT/US2006/023450.

U.S. Pat. No. 6,172,167 teaches a process for producing aliphatic polyester-amide polymers having the formula HO-D1-O—[—CO-AA1-CO—O-D1-O-]x-[CO-AA1-CO—O-AD-O]y-H, wherein O-D1-O represents a diol functionality, wherein CO-AA1-CO represents a short (preferably 6 or fewer carbon atoms) aliphatic dicarboxylic acid functionality, wherein O-AD-O represents a short (e.g. preferably 6 or fewer carbon atoms in the diamine) symmetrical, crystallizing amide diol functionality, wherein x and y are the number of repeat units in the polymer block inside the brackets.

As taught in U.S. Pat. No. 6,172,167, such polymers can be made from reaction mixtures comprising an amide diol. Amide diols which are particularly useful in the practice of the instant invention have the following structure;

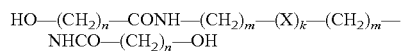

wherein X is NH, O or S, k is 0 or 1, m is an integer of from 1 to 4 and n is an integer of from 4 to 6.

The amide diol can be prepared by any suitable means, however it has been found advantageous to prepare the amide diol by the ring opening polymerization (ROP) reaction between at least one primary diamine and at least one lactone. The preparation of the amide diol can also be carried out according to the methods described in U.S. Pat. No. 3,025, 323 and in "Synthesis of Alternating Polyamideurethanes by Reacting Diisocyanates with N,N'-Di-(6-hydroxycaproyl) alkylenediamines and N-hydroxy-alkyl-6-hydroxycaproamide" by S. Katayama et al. in J. Appl. Polym. Sci., Vol. 15, 775-796 (1971).

A primary diamine is defined in this specification as an organic compound comprising two primary amine groups (i.e., two —NH$_2$ groups). The primary diamine may also comprise secondary and tertiary amine groups. Suitable diamines are ethylene diamine, diethylene triamine, butane diamine, preferably 1,4-butanediamine, and hexane diamine, preferably 1,6-hexanediamine The lactone preferably has 4, 5 or 6 carbon atoms. Suitable lactones include γ-butyrolactone, δ-valerolactone, ε-caprolactone, pentadeca lactone, glycolide and lactides.

The preferred method of carrying out such a ROP reaction to prepare the amide diol is to mix, in a stainless steel stirred-tank reactor, the lactone with the diamine in a ratio of at least 2 mol of lactone per mol of diamine, preferably in a ratio of 2.0 to 2.5 mol of lactone per mol of diamine. The reaction is preferably carried out under a nitrogen blanket. The reactants may be dissolved in a solvent, but generally it is preferable to carry out the reaction in the absence of a solvent in order to eliminate the effort required in separating the solvent from the polymer composition product. Preferably the reaction temperature is maintained at a temperature which is lower than the melting point of pure desired amide diol, preferably between 0° C. and 30° C. lower than the melting point. This generally results in a product comprising a high fraction of the desired amine diol product which can be used in subsequent process steps without the need for further purification. If the reaction is carried out in the absence of a solvent, the whole contents of the reactor will generally solidify. It is generally advantageous to allow the reaction mixture to cool down to ambient temperature and to allow the reaction product to stand for several hours, preferably for more than 6 hours, more preferably for more than 12 hours to allow any remaining diamine to react. The amide diol product may then be removed from the reactor by heating the reactor contents, preferably under a suitable inert gas blanket, until the product melts.

A particularly preferred amide diol is the condensation product prepared from ethylene diamine and ε-caprolactone, coded C2C in the examples herein and which has the following structure:

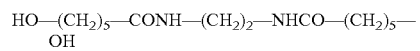

The aliphatic polyester-amide polymer can be made by contacting an amide diol with a low molecular weight dicarboxylic acid diester and a low molecular weight diol, heating to liquefy the resulting mixture, and, after which, injecting a catalyst.

Low molecular weight dicarboxylic acid diesters (i.e., dialkyl esters) are defined as having a molecular weight about 258 grams per mole or less. The alkyl moieties of the dicarboxylic acid diester are preferably the same or different and have between 1 and 3 carbon atoms. Preferably the alkyl moieties are methyl groups. The dicarboxylate moiety of the dicarboxylic acid diester preferably has between 2 and 8 carbon atoms, most preferably between 4 and 6 carbon atoms. Preferably the dicarboxylate moiety is a succinate, glutarate or adipate group. Suitable dicarboxylic acid esters include dimethyl succinate, dimethyl adipate, dimethyl oxalate, dimethyl malonate and dimethyl glutarate.

Volatile diols are defined in this specification as having a molecular weight of less than 1,8-octane diol. Suitable diols include monoethylene glycol, 1,3-propanediol, 1,4-butanediol, 1,5 pentane diol, 1,6 hexane diol and 1,7 heptane diol.

Generally a first stage of the reaction is carried out to form a pre-polymer. In this stage, the reaction is carried out in a stirred heated reactor or devolitizer, fitted with a reflux column, under an inert gas blanket. In a preferred embodiment solid amide diol is first mixed with the dicarboxylic acid diester. The mixture of amide diol and dicarboxylic acid diester is then slowly heated up to a temperature of about 140° C. or until such temperature that the amide diol dissolves completely. The mixture of amide diol and dicarboxylic acid diester is then maintained at this temperature for 1.5 to 3 hours. To minimize discoloration the bis-amide diol is first mixed with dimethyl adipate at ambient temperature and then the mixture is heated to make it liquid and at the same time it is believed that the most reactive free amine functions are captured by transamidation reaction with dimethyl adipate to amide functions. Then the volatile diol is added and finally the catalyst (at a moment when the most reactive species are believed to have reacted away). The volatile (low molecular weight) diol is introduced in stoichiometric excess, the new mixture is homogenized and finally a catalyst is injected to form a aliphatic polyester-amide pre-polymer having a number average molecular weight less than 2000 grams per mole.

Particularly, the volatile diol is added to the mixture of amide diol and dicarboxylic acid diester, and the new mixture is generally homogenized by continuous stirring. The temperature is generally maintained at or above the melting temperature of the amide diol, typically at about 140° C. The reaction is preferably carried out under an inert gas blanket at about atmospheric pressure. The catalyst is then preferably added to the reaction mixture. Any suitable compound for catalyzing transesterification and transamidification reactions may be used as the catalyst. Suitable catalysts include tetrabutoxy titanium (IV), zinc acetate and magnesium acetate.

The addition of the volatile diol and optional catalyst results in the evolution of a vapor comprising a low molecular weight alcohol or alcohol mixture corresponding to the alkyl moiety or moieties of the dicarboxylic acid diesters, and the formation of the pre-polymer. The vapor formed is distilled off at about atmospheric pressure from the reaction mixture comprising the pre-polymer. The reaction is continued until the evolution of alcohol subsides.

In a second stage of the polycondensation process the reaction is continued by reacting the pre-polymer with a non-volatile diol in a devolatizer reactor under reduced pressure to completely remove the free (i.e., unreacted and evolved) volatile diols and to increase the molecular weight and convert the pre-polymer with molecular weight less than 2000 gram/mole to a full polyester amide polymer with molecular weight 2000 g/mol or higher, preferably higher than 4000 gram/mole. At this point in time other reactive species like non-volatile diols can be admixed as to further increase the molecular weight or to introduce specific properties like branching or hydrophobic interactions.

A polymer of the formula HO-D2-O—[—CO-AA1-CO—O-D1,D2-O-]x-[CO-AA1-CO—O-AD-O]y-H can be made by contacting an aliphatic polyester-amide polymer having the formula HO-D1-O—[—CO-AA1-CO—O-D1-O-]x-[CO-AA1-CO—O-AD-O]y-H with a nonvolatile diol having the formula HO-D2-OH to form a mixture, the temperature of the mixture being sufficiently high to produce the polymer.

A polymer of the formula HO-D1-O—[—CO-AA1-CO—O-D1-O-]x-[CO-AA1-CO—O-AD-O]y-CO-AA1-CO—O-M-(O—[CO-AA1-CO—O-D1-O]$_x$'—[CO-AA1-CO—O-AD-O]y'-H)$_{n-1}$ can be made by contacting an aliphatic polyester-amide polymer having the formula HO-D1-O—[—CO-AA1-CO—O-D1-O-]x-[CO-AA1-CO—O-AD-O]y-H, HO-D1-O—[—CO-AA1-CO—O-D1-O-]x'-[CO-AA1-CO—O-AD-O]y'-H, or a mixture thereof with a polyol having the formula M-(OH)$_n$ to form a mixture, wherein n is 3 or more, the temperature of the mixture being sufficiently high to produce the polymer. M in the polyol M-(OH)$_n$ is an n valent organic moiety, preferably aliphatic or heteroaliphatic, alicyclic or heteroalicyclic or aromatic or heteroaromatic group, preferably having up to 20 carbon atoms. More preferably, M is aliphatic. Preferred examples of M-(OH)$_n$ include glycerine, trimethylolpropane, pentaerythritol, methylglucoside, sorbitol, and ethoxylated and propoxylated derivatives of those molecules.

A polymer of the formula HO-D1-O—[—CO-AA1-CO—O-D1-O-]x-[CO-AA1-CO—O-AD-O]y-CO-PA-(CO—O-D1-O—[CO-AA1-CO—O-D1-O]x'-[CO-AA1-CO—O-AD-O]y'-H)$_{n-1}$ can be made by contacting an aliphatic polyester-amide polymer having the formula HO-D1-O—[—CO-AA1-CO—O-D1-O-]x-[CO-AA1-CO—O-AD-O]y-H, HO-D1-O—[—CO-AA1-CO—O-D1-O-]x'-[CO-AA1-CO—O-AD-O]y'-H, or a mixture thereof with a polyacid ester having the formula PA-(CO—ORb)$_n$ to form a mixture, wherein n is 3 or more, the temperature of the mixture being sufficiently high to produce the polymer. PA in the polyacid ester PA-(CO—ORb)$_n$ is an n valent organic moiety, preferably aliphatic or heteroaliphatic, alicyclic or heteroalicyclic or aromatic or heteroaromatic group, preferably having up to 20 carbon atoms. Preferred PA include 1,3,5 benzene tricarboxylic acid; citric acid, agaric acid, and aconitic acid. Rb is an aliphatic group of 1-10 carbon atoms, preferably 1-6 carbons, more preferably —CH3, —CH2-CH3, propyl or isopropyl.

A polymer of the formula HO-D1-O—[—CO-AA1,AA2-CO—O-D1-O-]x-[CO-AA1,AA2-CO—O-AD-O]y-H can be made by contacting an aliphatic polyester-amide polymer having the formula HO-D1-O—[—CO-AA1-CO—O-D1-O-]x-[CO-AA1-CO—O-AD-O]y-H with a high boiling point diacid ester having the formula RO—CO-AA2-CO—OR to form a mixture, the temperature of the mixture being sufficiently high to produce the polymer.

A polymer of the formula HO-D2-O—[—CO-AA1-CO—O-D1,D2-O-]x-[CO-DD-CO—O-D1,D2-O]y-H can be made by contacting a pre-polymer having the formula HO-D1-O—[—CO-AA1-CO—O-D1-O-]x-[CO-DD-CO—O-D1-O-]y-H, wherein O-D1-O represents the residual of a volatile diol functionality, wherein CO-DD-CO represents the residual of a short (e.g. preferably 6 or fewer carbon atoms) symmetrical, crystallizing diamide diacid functionality, with a nonvolatile diol having the formula HO-D2-OH to form a mixture, the temperature of the mixture being sufficiently high to produce the polymer.

A polymer of the formula H—[O-D1-O—CO-AA1-CO-]x-[O-D1-O—CO-DD-CO-]y-O-M-(O-[CO-AA1-CO—O-D1-O-]x'-[CO-DD-CO—O-D1-O]y'-H)$_{n-1}$ can be made by contacting a polymer having the formula HO-D1-O—[—CO-AA1-CO—O-D1-O-]x-[CO-DD-CO—O-D1-O-]y-H, HO-D1-O—[—CO-AA1-CO—O-D1-O-]x'-[CO-DD-CO—O-D1-O-]y'-H, or a mixture thereof with a polyol having the formula M-(OH)$_n$ to form a mixture, wherein n is 3 or more, the temperature of the mixture being sufficiently high to produce a the polymer.

A polymer of the formula HO-D1-O—[—CO-AA1-CO—O-D1-O-]x-[OC-DD-CO—O-D1-O]y    OC-PA-(CO—[O-D1-O—CO-AA1-CO-]$_x$'[O-D1-O—CO-DD-CO]y'-O-D1-OH)$_{n-1}$ can be made by contacting a polymer having the formula HO-D1-O—[—CO-AA1-CO—O-D1-O-]x-[CO- DD-CO—O-D1-O]y-H, HO-D1-O—[—CO-AA1-CO—O-D1-O-]x'-[CO-DD-CO—O-D1-O]y'-H, or a mixture thereof with a polyacid or polyacid ester having the formula PA-(CO—ORb)$_n$ to form a mixture, wherein n is 3 or more, Rb is H or alkyl, and the temperature of the mixture being sufficiently high to produce the polymer.

A polymer of the formula HO-D1-O—[—CO-AA1,AA2-CO—O-D1-O-]x-[CO-DD-CO—O-D1-O]y-H can be made by contacting a polymer having the formula HO-D1-O—[—CO-AA1-CO—O-D1-O-]x-[CO-DD-CO—O-D1-O-]y-H with a high boiling point diacid ester having the formula RO—CO-AA2-CO—OR to form a mixture, the temperature of the mixture being sufficiently high to produce the polymer.

The short symmetrical, crystallizing diamide diacid functionality herein is the same as defined and taught in the above-referenced U.S. Pat. No. 6,172,167. A particularly preferred diamide diacid functionality is the condensation product prepared from ethylene diamine and dimethyl adipate, coded A2A in the examples herein.

In this specification high boiling point dicarboxylic acid diesters are defined as aliphatic dicarboxylic acid diesters having a molecular weight greater than 202 g/mol, preferably greater than about 258 g/mol. The alkyl moieties of the dicarboxylic acid diester are preferably the same or different and have between 1 and 3 carbon atoms. Preferably the alkyl moieties are methyl groups. The dicarboxylic acid moiety preferably has between 7 and 10 carbon atoms, most preferably either 9 or 10 carbon atoms. Preferably the dicarboxylic acid moiety is an azelate or sebacate group. Preferred high boiling point dicarboxylic acid esters are dimethyl azelate, dimethyl sebacate and dimethyl suberate.

Suitable nonvolatile diols in the instant invention include higher glycols such as dipropylene glycol or tripropylene glycol, polyalkylene oxides, polyethylene glycols (PEG's of molecular weight 400 to 8000) and EO capped polypropylene glycols of molecular weight 400 to 4000), dimer diols or Soy polyols or other high molecular weight natural diols like mentioned in Jetter et al. Phytochemistry 55, 169-176 (2000). Polyols may be used instead of diols in the instant invention. Polyols suitable for use in the instant invention include glycerol, trimethylol propane, sorbitol and sucrose.

The reaction of the aliphatic polyester-amide polymer with the nonvolatile diol, the polyol, polyacid ester or the high boiling point dicarboxylic acid diester is generally carried out under an inert gas blanket. The mixture is then heated over a period of typically 2 to 3 hours to a temperature of about 180° C. or to such temperature that the resulting amide ester polymer remains in the molten or dissolved state. The pressure is typically about atmospheric pressure. The reaction can result in the evolution of low molecular weight alcohol which is removed by distillation from the system.

The pressure in the reactor is then gradually lowered to an absolute pressure of about 5 millibar to initiate the distillation under vacuum of any remaining volatile materials. The resulting polymer composition can then be cooled to about 150° C. and brought to atmospheric pressure, after which the polymer may be removed from the reactor whilst still in the molten state.

The polymers described above can be modified with, for example and without limitation thereto, other polymers, tackifiers, oil and additives. In addition, UV absorber can be used in conjunction with the polymer, as well as other performance-enhancing additives such as pigments or dyes for coloring all or part of the laminate, antioxidants, energy reflective or absorbing additives and the like.

As used herein, the term "aliphatic" refers to diradicals of hydrocarbons which are saturated or unsaturated (alkanes, alkenes, alkynes) and which may be straight-chain or branched. Preferably, aliphatic is a diradical of a saturated alkane. Aliphatic groups can be optionally substituted with one or more, preferably 6 or less, various substituents or functional groups, including among others halides (preferably fluoro), hydroxy groups, thiol groups (i.e., —SH), carboxylic ester groups (preferably, COO—($C_1$ to $C_{12}$ alkyl)), ketone groups (e.g., $C_1$ to $C_{12}$ acyl), carboxylic acid groups (i.e., —COOH), amines (preferably —NR$^D$R), and carboxamides (preferably —C(O)NR$^D$R$^E$)), wherein each R$^D$ and R$^E$ independently is H or $C_1$ to $C_{12}$ alkyl. Preferred aliphatic groups include $C_2$-$C_{12}$ alkylene, more preferably $C_2$-$C_8$ alkylene, such as —CH$_2$CH$_2$—, —CH$_2$C(CH$_3$)$_2$CH$_2$—, and the like. Particularly preferred aliphatic groups are ethylene, butylene (especially 1,4-butylene), and hexylene (especially 1,6-hexylene).

A "heteroaliphatic" group is an aliphatic group that contains one or more non-carbon atoms in the hydrocarbon chain of the aliphatic group (e.g., one or more non-neighboring CH$_2$ groups are replaced with O, S or NH). Preferred heteroaliphatic groups include $C_2$-$C_{12}$ heteroalkylenes, more preferably $C_2$-$C_8$ heteroalkylenes, and particularly where the one or more non-carbon atoms are oxygen. Heteroaliphatic groups can be substituted as described above for aliphatic groups.

The term "alicyclic" refers to diradicals of hydrocarbons that have one or more saturated or mono-unsaturated rings (e.g., three to ten-membered rings) and which may be bicyclic. Alicyclic groups can include portions that are branched chain and/or straight-chain aliphatic in combination with such a ring (i.e., cyclic hydrocarbon). Alicyclic groups can be substituted, as noted above for aliphatic groups. A "heteroalicyclic" group is an alicyclic group that contains one or more heteroatoms (non-carbon atoms) in a ring or in a straight-chain or branched chain aliphatic portion of the alicyclic group (e.g., one or more non-neighboring CH$_2$ groups can be replaced with O, S or NH). Heteroalicyclic groups can be substituted, as noted above for alicyclic groups.

The term "aromatic" refers to diradicals of hydrocarbons that comprise one or more aromatic rings, preferably of from 5 to 10 ring atoms, which may be fused rings (e.g., as in a naphthalene group). Aromatic groups can include portions that are branched and/or straight-chain aliphatic and/or alicyclic in combination with the aromatic rings. A preferred aromatic group is phenylene. Aromatic groups can be substituted on the aromatic rings or the portions, if any, that are aliphatic and/or alicyclic, or a combination thereof, as noted above for aliphatic groups. A "heteroaromatic" group is an aromatic group that contains one or more heteroatoms (non-carbon atoms) in an aromatic ring (e.g., a pyridine ring). A CH in an aromatic ring can be replaced with O, S or N, preferably there are no O—O, O—S, or S—S bonds. In any alicyclic or aliphatic portions of aromatic groups, one or more non-neighboring CH$_2$ groups can be replaced with a heteroatom (e.g., O, S, and NH). Heteroaromatic groups can be substituted as described above for aromatic groups.

Proton NMR may be used to determine monomer purity, copolymer composition, and copolymer number average molecular weight utilizing the CH$_2$OH end groups. Proton NMR assignments are dependent on the specific structure being analyzed as well as the solvent, concentration, and temperatures utilized for measurement. For ester amide monomers and co-polyesteramides, d4-acetic acid is a convenient solvent. For ester amide monomers of the type called DD that are methyl esters typical peak assignments are ~3.6-3.7 ppm for C(=O)—OCH$_3$; ~3.2-3.3 ppm for N—CH$_2$—; ~2.2-2.4 ppm for C(=O)—CH$_2$—; and ~1.2-1.7 ppm for C—CH₂—C. For co-polyesteramides that are based on DD with 1,4-butanediol butanediol, typical peak assignments are ~4.1-4.2 ppm for C(=O)—OCH₂—; ~3.2-3.4 ppm for N—CH₂—; ~2.2-2.5 ppm for C(=O)—CH₂—; ~1.2-1.8 ppm for C—CH₂—C, and ~3.6-3.75—CH₂OH end groups.

The following examples are illustrative of the invention but are not intended to limit its scope.

EXAMPLES

Example A

Preparation of the Amide Diol Ethylene-N,N''-dihydroxyhexanamide (C2C)

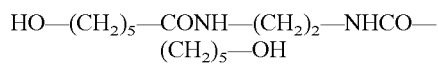

C2C monomer is prepared by reacting 1.2 kg ethylene diamine (EDA) with 4.56 kg of ε-caprolactone under a nitrogen blanket in a stainless steel reactor equipped with an agitator and a cooling water jacket. An exothermic condensation reaction between the ε-caprolactone and the EDA occurs which causes the temperature to rise gradually to 80 degrees Celsius (° C.). A white deposit forms and the reactor contents solidify, at which point the stirring is stopped. The reactor contents are then cooled to 20° C. and are then allowed to rest for 15 hours. The reactor contents are then heated to 140° C. at which temperature the solidified reactor contents melt. The liquid product is then discharged from the reactor into a collecting tray. A nuclear magnetic resonance study of the resulting product shows that the molar concentration of C2C in the product exceeds 80 percent. The melting point of the C2C product is determined to be 140° C.

Example 1

Preparation of Polybutylene Adipate with 12.5 Mole % C2C in Monomer Feed

Into a 1-neck 500 mL round bottom flask is loaded titanium (IV) butoxide (0.32 g, 0.94 mmol), N,N'-1,2-ethanediyl-bis[6-hydroxyhexanamide] (C2C, 22.42 g, 77.74 mmol), dimethyl adipate (108.38 g, 0.62216 mol), and 1,4-butanediol (98.12 g, 1.089 mol). A stir-shaft and blade are inserted into the flask along with a modified Claisen adaptor with Vigreaux column and distillation head. Apparatus is completed with stir bearing, stir motor, thermometer, take-off adaptor, receiver, heat-tracing and insulation, vacuum pump, vacuum regulator, nitrogen feed, and temperature controlled bath. Apparatus is degassed and held under positive nitrogen. Flask is immersed into a 160° C. bath with temperature raised to 175° C. for a total of 2 hours. Receiver is changed and vacuum is applied according to the following schedule: 5 minutes, 450 Torr; 5 minutes, 100 Torr; 5 minutes, 50 Torr; 5 minutes, 40 Torr; 10 minutes, 30 Torr; 10 minutes, 20 Torr; 1.5 hours, 10 Torr. Apparatus is placed under nitrogen, receiver changed, and placed under vacuum ranging over about 0.23 to 0.48 Torr with the following schedule: 2.0 hours, 175° C.; 4 hours, to/at 190° C. Inherent viscosity=0.24 dL/g (methanol:chloroform (1:1 w/w), 30.0° C., 0.5 g/dL). By proton NMR in d₄-acetic acid, $M_n$ from end groups is 8030 and 12.4 mole % of polymer repeat units contain C2C.

Example 2

Preparation of Polybutylene Adipate with 18 Mole % C2C in Monomer Feed

Into a 1-neck 500 mL round bottom flask is loaded titanium (IV) butoxide (0.31 g, 0.91 mmol), N,N'-1,2-ethanediyl-bis[6-hydroxyhexanamide] (C2C, 30.80 g, 0.1068 mol), dimethyl adipate (103.37 g, 0.5934 mol), and 1,4-butanediol (97.33 g, 1.080 mol). A stir-shaft and blade are inserted into the flask along with a modified Claisen adaptor with Vigreaux column and distillation head. Apparatus is completed with stir bearing, stir motor, thermometer, take-off adaptor, receiver, heat-tracing and insulation, vacuum pump, vacuum regulator, nitrogen feed, and temperature controlled bath. Apparatus is degassed and held under positive nitrogen. Flask is immersed into a 160° C. bath with temperature raised to 175° C. for a total of 2 hours. Receiver is changed and vacuum is applied according to the following schedule: 5 minutes, 450 Torr; 5 minutes, 100 Torr; 5 minutes, 50 Torr; 5 minutes, 40 Torr; 10 minutes, 30 Torr; 10 minutes, 20 Torr; 1.5 hours, 10 Torr. Apparatus is placed under nitrogen, receiver changed, and placed under vacuum ranging over about 0.31 to 0.46 Torr with the following schedule: 2.0 hours, 175° C.; 4 hours, to/at 190° C. Inherent viscosity=0.26 dL/g (methanol:chloroform (1:1 w/w), 30.0° C., 0.5 g/dL). By proton NMR in d₄-acetic acid, $M_n$ from end groups is 7120 and 17.5 mole % of polymer repeat units contain C2C.

Example 3

Preparation of Polybutylene Adipate with 18 Mole % C2C in Monomer Feed

Into a 1-neck 500 mL round bottom flask is loaded titanium (IV) butoxide (0.31 g, 0.91 mmol), N,N'-1,2-ethanediyl-bis[6-hydroxyhexanamide] (C2C, 30.80 g, 0.1068 mol), dimethyl adipate (103.37 g, 0.5934 mol), and 1,4-butanediol (97.33 g, 1.080 mol). A stir-shaft and blade are inserted into the flask along with a modified Claisen adapter with Vigreaux column and distillation head. Apparatus is completed with stir bearing, stir motor, thermometer, take-off adaptor, receiver, heat-tracing and insulation, vacuum pump, vacuum regulator, nitrogen feed, and temperature controlled bath. Apparatus is degassed and held under positive nitrogen. Flask is immersed into a 160° C. bath with temperature raised to 175° C. for a total of 2 hours. Receiver is changed and vacuum is applied according to the following schedule: 5 minutes, 450 Torr; 5 minutes, 100 Torr; 5 minutes, 50 Torr; 5 minutes, 40 Torr; 10 minutes, 30 Torr; 10 minutes, 20 Torr; 1.5 hours, 10 Torr. Apparatus is placed under nitrogen, receiver changed, and placed under vacuum ranging over about 0.36 to 0.46 Torr with the following schedule: 2 hours, 175° C.; 2 hours, to/at 190° C., and 3 hours to/at 210° C. Inherent viscosity=0.32 dL/g (methanol:chloroform (1:1 w/w), 30.0° C., 0.5 g/dL). By proton NMR in d₄-acetic acid, $M_n$ from end groups is 11,700 and 17.3 mole % of polymer repeat units contain C2C.

Example 4

Preparation of Polybutylene Adipate with 25 Mole % C2C in Monomer Feed

Material is made by similar process to the above examples. Inherent viscosity of product=0.25 dL/g (methanol:chloroform (1:1 w/w), 30.0° C., 0.5 g/dL). By proton NMR in $d_4$-acetic acid, $M_n$ from end groups is 6100 and 23.1 mole % of polymer repeat units contain C2C.

Example 5

Preparation of Polybutylene Adipate with 50 Mole % C2C in Monomer Feed

Material is made by similar process to the above examples. Inherent viscosity=0.32 dL/g (methanol:chloroform (1:1 w:w), 30.0° C., 0.5 g/dL). By proton NMR in $d_4$-acetic acid, $M_n$ from end groups is 7480 and 51.2 mole % of polymer repeat units contain C2C.

Example 6

Sample Preparation and Testing Methods

Compression Molding

Figure 2:
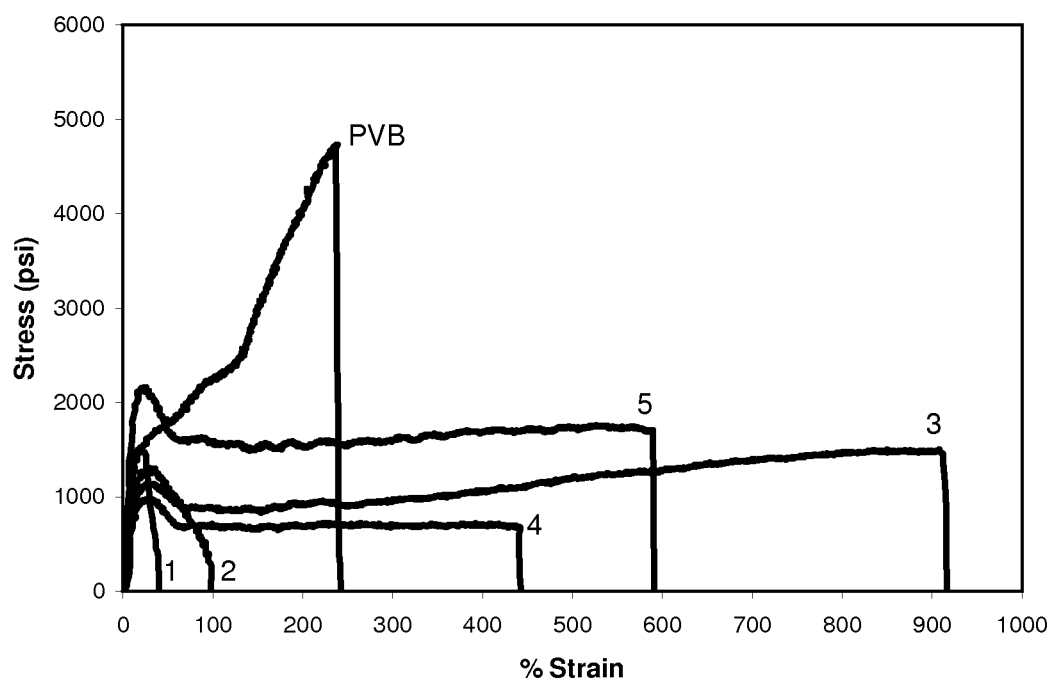
FIG. 2 is a plot comparing high rate tensile of polymers useful in the present invention compared to PVB.

Polymers are dried overnight in an oven at 50° C. prior to use. 6"×6" films of 15 mils thickness are compression molded using a Tetrahedron press set just above the melting temperature of the polymer with the following pressure cycle: 800 lbs for 5 minutes, 5000 lbs for 4 minutes, and 10,000 lbs for 3 minutes. Samples are allowed to cool for 20 minutes with 500 lbs pressure.
Tensile Measurements The stress-strain behavior in uniaxial tension of 15 mils compression molded films is measured according to ASTM 1708 using the microtensile specimen geometry. Specimens are stretched using an Instron 5581 at a crosshead speed of 20 mm/minute. The grip-grip separation is 22.25 mm which includes the fillet section. Engineering strain is calculated from the crosshead displacement. Engineering stress is defined conventionally as the force per initial unit cross-sectional area. A minimum of five specimens is tested for each sample.
High Speed Tensile Testing The high-rate stress-strain behavior of 15 mils compression molded films is measured using an MTS frame at a crosshead speed of 1 m/s. Mictrotensile specimens are used and the test is conducted under ambient conditions. Engineering strain is calculated from the crosshead displacement. Engineering stress is defined conventionally as the force per initial unit cross-sectional area. Three specimens are tested for each sample.
Optical Haze The internal haze of 15 mils compression molded films is measured according to ASTM D1003 (Procedure A) using a XL-21 Hazegard hazemeter. Mineral oil is applied to the surface of the film to minimize contributions from the film surface. Five measurements are taken for each sample.
Polymer-Glass Adhesion Testing 154 mm×65 mm×2 mm films are compression molded directly onto plain untempered glass (203 mm×117 mm×4 mm) at 130° C. in a PHI manual hot press (Model # PW-L425). Pre-weighed amounts of polymer are placed between polytetrafluoroethylene sheets and heated at 130° C. under 5000 lbs for 5 minutes, followed by 10,000 lbs for 5 minutes. The sample are then removed from the heated plates and allowed to cool for 5 minutes on the lab bench to ambient temperature. Prior to molding, a Teflon sheet is partially inserted between the polymer and the glass surface so that ca. 45 mm of the film length does not adhere to the glass. The unbonded portion of the film is then carefully rolled to 180° and attached to an adhesive tape. The adhesive tape is then gripped by the upper jaws of the Instron while the lower jaws grip the glass surface. The 2 mm thick film is peeled slowly (crosshead speed of 25 mm/min) in order to minimize any plastic stretching of the film at the interface. For the same reason, a large film thickness of 2 mm is used to impart a high enough rigidity in order to avoid plastic stretching and allow only peeling at the interface when the sample is stretched. The load normalized by the width of the sample is reported as a function of the peel extension. Two specimens are tested for each sample. Various properties of polymers according to the invention compared to PVB are provided in Table 1 and FIG. 1-3. The curves in the Figs. are labeled according to the corresponding example number (e.g., curve "1" corresponds to Example 1).

The data show the higher performance of selected materials of this invention in peel adhesion (example 3) and energy absorption as measured by the area under the stress-strain curve at high rate of testing (examples 3 and 5) when compared to PVB.

TABLE 1

Properties of materials

| Example | Area under high rate tensile curve (in-lb/in$^2$) | Internal Haze (%) | Tensile Strength (MPa) | % Strain @ Break |
|---|---|---|---|---|
| 1 | 390 | 8.0 | 8.8 | 636 |
| 2 | 710 | 3.6 | 10.9 | 846 |
| 3 | 9540 | 4.8 | 24.3 | 1300 |
| 4 | 2470 | 13.6 | 8.0 | 831 |
| 5 | 7180 | 29.1 | 20.0 | 774 |
| PVB | 5310 | — | — | — |

Additional Examples of Laminate Preparation

Example 7

This example provides bubble free laminates of good quality.

Three millimeter thick Planilux glass is obtained from AGI-USA Fab (Florida). Prior to assembly, the glass substrates are washed with deionized water and allowed to dry. Two 12 inch by 12 inch pieces of glass are assembled with a PEA film in between. The assembly is placed between two sheets of rubber separated by a release film. The whole set is placed in a programmable press and the following heating cycle may be utilized:
1. Heat to 192° F. (89° C.) and 31,000 lbs of load at a rate of 2,000 lbs per minute.
2. Maintain these conditions for 1 hour and 15 minutes.
3. Cool down to 100° F. (38° C.) at a rate of 20° F./minute (10° C./minute) maintaining 31,000 lbs of load.
4. Maintain under conditions of step 3 for 5 minutes.

Example 8

Figure 3:
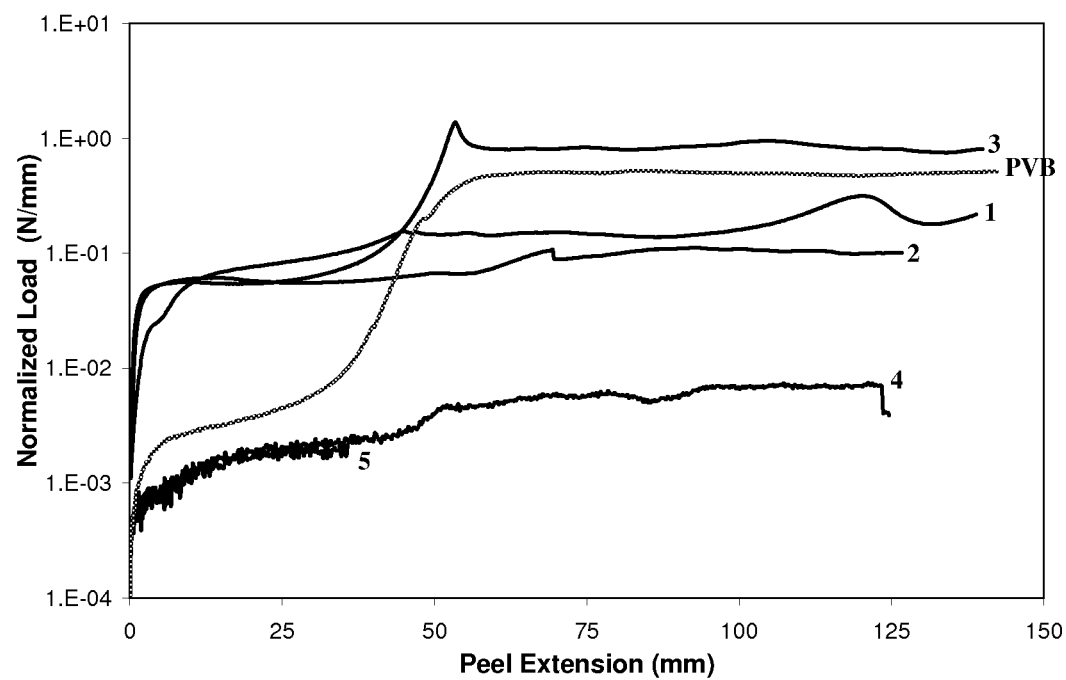
FIG. 3 is a plot comparing 180 degree adhesion peel strength of polymers useful in the present invention compared to PVB.

Impact Testing of Glass Laminates Comprising Polyester Amides Useful in the Present Invention Based on the data graphically illustrated in FIG. 3 showing that the polyester amide (PEA) of Example 3 has a peel strength that is superior to the peel strength of comparator PVB, the synthesis of the PEA of Example 3 was scaled-up as described below in section (A).

(A). Scale-up preparation of PEA from polybutylene adipate with 18 mole percent (mol %) 1,2-bis(6-hydroxy caproamido)ethane (C2C-18 mol %) monomer, dimethyl adipate (DMA), and 1,4-butanediol (BD)

1. Equipment: LIST kneader CRP 10 Batch and its thermal oil unit, cooler, collecting drum, vacuum pump Pfeiffer UNO100 for low vacuum and Busch Panda rotary robe booster model WV2000 and model WV1000, and dry screw vacuum pump Cobra NC 0250 (3 levels) for deep vacuum.
2. Preparation The kneader was charged with 5303 g DMA, 1581 g C2C-18 mol % powder, and 4310 g BD and at 136° C. with 212.2 g titanium (IV) butoxide catalyst solution (21.2 g titanium(IV) butoxide in BD 191 g).

2.1. Methanol Distillation

During 60 minutes the kneader temperature was increased slowly up to 180° C. and later to 185° C. within 20 minutes 1510 g Material was collected in the cooling trap.

2.2. 1,4-Butanediol Distillation

In the next 25 minutes the pressure in the kneader was slowly decreased to about 90 millibars (mbar). Because of evaporation the temperature decreased to 183° C. The vacuum was broken with nitrogen. Collected condensate=300 g. Trial was interrupted and continued next day.

Next day: mixing of the polymer in the kneader was started at 140° C. The process conditions over the next 10.5 hours were the following:

Duration: 25 minutes, final vacuum: 6 mbar final temperature: 161° C.

Duration: 45 minutes, final vacuum: 1 mbar final temperature: 183° C.

Duration: 4.3 hours, final vacuum: 0.12 mbar final temperature: 189° C.

Duration: 4.5 hours, vacuum: 0.12-0.1 mbar final temperature: 190-191° C.

Final product was about 5750 g of PEA derived from C2C-18 mol %. Some of this final product was used to prepare glass laminate samples as described below in section (B).

(B). Preparation of 31 Glass Laminates with PEA derived from C2C-18 mol %

15.24 cm×15.24 cm films comprised of the PEA derived from C2C-18 mol % of Example 8, section (A) were compression molded in a programmable press—Tetrahedron MTP-14. The films were molded against fluorocarbon coated aluminum plates utilizing a 0.76 mm thick chase with the following heating cycle:

1. Heat to 210° F. (99° C.) and 2,272 kg of load and maintain under those condition for 5 minutes.
2. Maintain at 210° F. (99° C.) and increase pressure to 4,545 kg for 10 minutes.
3. Cool film to 90° F. (32° C.) and 4,545 kg at the maximum cooling rate of the press.

These films were compression molded a second time using the same heating cycle. In the second molding, the film was placed between two sheets of polyvinyl fluoride release film and two pieces of silastic rubber containing an embossing pattern. The pattern transferred to the film aids in the elimination of air bubbles during the lamination process. The final film thickness was approximately 0.70 mm. These films were utilized to make 31 glass laminates.

Three millimeter thick Planilux glass was obtained from AGI-USA Fab (Florida). Prior to assembly, the glass substrates were washed with deionized water and allowed to dry. Two 15.24 centimeters (cm)×15.24 cm pieces of glass were assembled with a PEA film in between. The assembly was placed between two sheets of rubber separated by a release film. The whole set was placed in the programmable press and the following heating cycle was utilized:

1. Heat to 192° F. (89° C.) and 14,090 kg of load at a rate of 909 kg per minutes.
2. Maintain these conditions for 1 hour and 15 minutes.
3. Cool down to 100° F. (38° C.) at a rate of 20° F./minute (10° C./minute) maintaining 14,090 kg of load.
4. Maintain under above conditions for 5 minutes.

These conditions provided bubble free laminates of good quality. Good adhesion can be obtained at lower pressures and slightly higher temperature (10-15° C. higher). However, the present cycle was chosen to balance adhesion with polymer flow so that interlayer thickness could be maintained. In general, thicknesses between 0.3 mm and 0.5 mm were obtained. A total of 31 glass laminates, referred to below as Samples 1 to 31, respectively, were prepared. Samples 5, 24, and 26 each had impurities (about 0.4 cm (1 inch) to 0.8 cm (2 inches), about 1.2 cm (3 inches), and about 0.4 cm (1 inch) to 0.8 cm (2 inches) off center, respectively) and were not tested. Sample 14 had impurity specifications and an area (about 1.2 cm or 3 inches) of discoloration in its center and was not tested. The remaining samples were impact tested as described below in section (C).

(C). Impact Testing of Glass Laminates

Standard ANSI/SAE Z26.1-1996 was followed "American National Standard for Safety Glazing Materials for Glazing Motor Vehicles and Motor Vehicle Equipment Operating on Land Highways—Safety Standard." In particular, Impact Test 12 (ball drop) and Impact Test 9 (dart drop) were performed. All tests were performed at room temperature.

Also, Penetration Resistance Test 26 was performed. Penetration Resistance Test 26 utilizes a 2.254 kg (5 lb) solid, smooth steel ball that is dropped from a height of 3.66 meters (m) (12 feet (ft)) onto the center of a glass laminate. A passed test allows the presence of a large number of cracks and significant deformation of the glass laminate. However for a passed test, the steel ball shall not pass completely through the specimen glass laminate within a 5-second interval after impact. This test calls for 10 glass laminate specimens; only four specimens were tested.

The results of impact testing glass laminate samples 1 to 31 are described below in section (D).

(D). Evaluation of Glass Laminates in Impact Test 12 (ball drop), Impact Test 9 (dart drop), or Penetration Resistance Test 26.

The impact characteristics of glass laminates were assessed through two tests described in the ANSI/SAE Z26.1-1996 standard: Impact Test 12 (ball drop) and Impact Test 9 (dart drop). In Impact Test 12, a 224 g (0.5 lb) solid, smooth steel ball is dropped on a laminate from a resting position. The ball should strike the specimen in the center. The glass laminate is supported on a steel frame with a rubber gasket. An aluminum pan is placed below the specimen to collect any glass that may break loose from the laminate upon impact. The weight of lost glass is measured. The standard calls for samples to be tested with the ball dropped from 9.14 m (30 ft). Ten samples were tested at a drop height of 9.14 m.

The standard specifies that a successful test implies glass laminates that have large number of cracks upon impact without separation of large pieces of glass from the interlayer polymer material. Furthermore, at the point immediately opposite to the point of impact glass may leave the specimen. If this occurs, only an area smaller than 645 mm$^2$ (1 in$^2$) of exposed interlayer material must appear and total separation of glass from the interlayer polymer should be less than 1935 mm² (3 in²). These are denominated as the one inch square and three inch square requirements.

Table 2 shows the results of Impact Test 12. Samples 2, 3, 4, 6, 13, 27, 28, 29, 30, 31 were tested at 9.14 m. The weight loss varied significantly from sample to sample. It reached a maximum value of 7.1 g in sample 4. Nevertheless, the spalling area was under 6.45 cm² for all cases and no delamination was observed. Therefore, all specimens tested with Impact Test 12 passed the test.

In Impact Test 9 (dart drop), which is designed to study the behavior of the glass laminate under impact from a small hard object, a steel dart of specific dimensions and a weight of 196-201 g is dropped from a height of 9.14 m (30 ft) so that it strikes the center of the sample. In this case, the dart may crack the laminate and produce a hole. However, for a passed test, the dart should not go through the hole. It is also allowable to have small pieces of glass disengaged from the specimen immediately around the striking point but they should not be loose of the interlayer beyond 38 mm (1.5 inches) from the crack. Samples 1, 10 and 15 were tested. All samples tested with Impact Test 9 passed the test. Results of Impact Tests 26, 9 and 12 are shown in Table 2. In Table 2, results of impact testing of glass laminates: Standard ANSI/SAE Z26.1-1996 was followed "American National Standard for Safety Glazing Materials for Glazing Motor Vehicles and Motor Vehicle Equipment Operating on Land Highways—Safety Standard." In particular, Impact Test 12 (ball drop) and Impact Test 9 (dart drop). All tests were performed at room temperature.

The results of the Penetration Resistance Test 26 were considered inconclusive.

The results of Example 8 show that the PEA useful in the present invention may be used to prepare glass laminates, including glass laminates that pass standardized impact tests. The invention glass laminates are useful for motor vehicle, building (e.g., windows and doors), and other applications where impact performance is a desired characteristic.

Example 9

Materials

Materials from Example 3 based on polybutylene adipate (PBA) and C2C segments were utilized. The molecular weight by proton NMR in $d_4$-acetic acid, $M_n$ from end groups is 11,700 and 17.3 mole % of polymer repeat units contain C2C. The three different substrates utilized are described in Table 3.

TABLE 3

Substrate materials used for Dual Cantilever Beam (DCB) testing

| Substrate Material | Source | Thickness |
|---|---|---|
| Cold-Rolled Steel (CRS) | Curtis Steel | 0.212 inch |
| PVC (Type 1 Grade 1) | AIN Plastics | 0.250 inch |
| PC (Makrolon GP) | AIN Plastics | 0.220 inch |

TABLE 2

| Number | Average Thickness (mm)* | Drop Height (m) | Laminate Thickness (mm) | Hole in Laminate | 1" square requirement (spall area of bottom layer, in²) | 3" square requirement (total delaminated area in²) | mass of fragmented glass after ball drop from bottom layer (g) | Test Result | Comments |
|---|---|---|---|---|---|---|---|---|---|
| 1 | 0.36 (0.05) | 9.14 | 6.40 | n/a | 7.5 | n/a** | n/a | pass | Test 9 |
| 2 | 0.35 (0.04) | 9.14 | 6.38 | no | 0.15 | 0 | 1.2 | pass | Test 12 |
| 3 | 0.47 (0.04) | 9.14 | 6.48 | no | 0.8 | 0 | 3.9 | pass | Test 12 |
| 4 | 0.38 (0.12) | 9.14 | 6.50 | no | 0.9 | 0 | 7.1 | pass | Test 12 |
| 5 | 0.31 (0.07) | n/t*** | n/t | n/t | n/t | n/t | n/t | n/t | n/t |
| 6 | 0.27 (0.15) | 9.14 | 6.40 | no | 0.5 | 0 | 2.1 | pass | Test 12 |
| 7 | 0.41 (0.12) | 5 | n/a | no | 0.08 | 0 | 0.7 | pass | Test 12 |
| 8 | 0.36 (0.08) | 5 | 6.43 | no | 0.07 | 0 | 0.7 | pass | Test 12 |
| 9 | 0.34 (0.07) | 5 | 6.25 | no | 0.2 | 0 | 2.1 | pass | Test 12 |
| 10 | 0.39 (0.15) | 9.14 | 6.50 | n/a | n/a | n/a | 1.8 | pass | Test 9 |
| 11 | 0.36 (0.07) | 5 | 6.40 | no | 0.05 | 0 | 1.5 | pass | Test 12 |
| 12 | 0.33 (0.13) | 5 | 6.48 | no | 0.3 | 0 | 1.7 | pass | Test 12 |
| 13 | 0.26 (0.12) | 9.14 | 6.25 | no | 0.1 | 0 | n/a | pass | Test 12 |
| 14 | 0.40 (0.11) | n/t | n/t | n/t | n/t | n/t | n/t | n/t | n/t |
| 15 | 0.29 (0.15) | 9.14 | 6.43 | n/a | n/a | n/a | 9.5 | pass | Test 9 |
| 16 | 0.24 (0.11) | 8 | 6.32 | no | 0.15 | 0 | 3.2 | pass | Test 12 |
| 17 | 0.30 (0.14) | 3.7 (12 feet) | n/a | n/a | n/a | n/a | 13.6 | Pass | Test 26 |
| 18 | 0.31 (0.07) | 8 | 6.40 | no | 0.01 | 0 | 0.1 | pass | Test 12 |
| 19 | 0.40 (0.14) | 3.7 | 6.27 | n/a | n/a | n/a | 119.7 | fail | Test 26 |
| 20 | 0.33 (0.09) | 3.7 | 6.40 | n/a | n/a | n/a | 7.1 | pass | Test 26 |
| 21 | 0.30 (0.06) | 3.7 | 6.32 | n/a | n/a | n/a | 219 | fail | Test 26 |
| 22 | 0.42 (0.06) | 8 | 6.45 | no | 0.25 | 0 | 2.2 | pass | Test 12 |
| 23 | 0.50 (0.09) | 8 | 6.53 | no | 0.8 | 0 | 2.9 | pass | Test 12 |
| 24 | 0.56 (0.11) | n/t | n/t | n/t | n/t | n/t | n/t | n/t | n/t |
| 25 | 0.33 (0.13) | 8 | 6.43 | no | 0.9 | 0 | 8.6 | pass | Test 12 |
| 26 | 0.60 (0.2) | n/t | n/t | n/t | n/t | n/t | n/t | n/t | n/t |
| 27 | 0.40 (0.11) | 9.14 | 6.32 | no | 0.9 | 0 | 5.7 | pass | Test 12 |
| 28 | 0.39 (0.09) | 9.14 | 6.43 | no | 0.3 | 0 | 3.9 | pass | Test 12 |
| 29 | 0.37 (0.09) | 9.14 | 6.45 | no | 0.5 | 0 | 5.1 | pass | Test 12 |
| 30 | 0.31 (0.04) | 9.14 | 6.38 | no | 0.9 | 0 | 5.3 | pass | Test 12 |
| 31 | 0.42 (0.06) | 9.14 | 6.50 | no | 0.05 | 0 | 1.3 | pass | Test 12 |

*Average of four measurements. Number in parenthesis is standard deviation.
**n/a means not available.
***n/t means not tested.

Sample Preparation

The materials of the example were initially pressed into an 18 mil (0.457 μm) plaque using a 4"×4" (101.6 mm×101.6 mm) chase. The press conditions are shown in Table 4.

TABLE 4

Press conditions for preparation of 18 mil (0.457 μm) plaque

| Temp, °F. (°C.) | Force, klb* (kg) | Time, min |
|---|---|---|
| 210 (99) | 5 (2270) | 5 |
| 210 (99) | 10 (4540) | 10 |
| 100 (38) | 10 (4540) | 5 |
| end | end | end |

*kilopounds

The CRS substrate materials were cut into 1"×7" (25.4 mm×177.8 mm) specimens and the PVC and polycarbonate (PC) substrate materials cut in to 1"×8" (25.4 mm×203.2 mm) specimens. All were cleaned with isopropyl alcohol and the edges coated with a release spray in order to prevent adhesion of the MSA layer to the edges of the substrate. A thin strip of the pre-pressed MSA materials was prepared (1.2 grams) and placed in between the two substrates and two layers of Teflon sheet were inserted (~2 inches (50.8 mm) long) from one edge across the width of the sample, to act as a crack initiator for the fracture test. And additional two layers of the Teflon sheet were inserted at the opposite end to ensure uniform thickness of the MSA layer across the length of the specimen during the pressing process. The samples were then placed in the press under the conditions described in Table 5. Six samples were prepared at a time. The samples were removed from the press and the edges trimmed with a razor blade. Metallic blocks were then glued onto the primed specimens using a two-part Plexus methacrylate adhesive. The blocks were held to the composite specimens using a large C-clamp and allowed to sit overnight.

TABLE 5

Press conditions for preparation of 18 mil (0.457 μm) plaque

| Temp, °F. (°C.) | Force, klb (kg) | Time, min |
|---|---|---|
| 210 (99) | 0.6 (272.4) | 5 |
| 210 (99) | 1.2 (544.8) | 10 |
| 210 (99) | 2.0 (908) | 2 |
| 100 (38) | 2.0 (908) | 5 |
| end | end | end |

Test Methods

Interlaminar fracture toughness was measured in Mode I using the dual cantilever beam (DCB) geometry in accordance with ASTM standard D-5528 Standard Test Method for Mode I Interlaminar Fracture Toughness (Adhesive Fracture Energy), $G_{IC}$. The samples were gripped on a MTS 810 servo-hydraulic test frame using hinges that accommodated the blocks. A dowel pin was used to hold the specimen in place during the experiment. The samples were loaded at a fixed rate of 5 mm/minutes and during the test, both load and stroke signals were recorded using a computer controlled data acquisition system. The G1C was calculated using the following equation:

$$G_{1C} = \frac{3P\delta}{2B(a + |\Delta|)}$$

Figure 4:
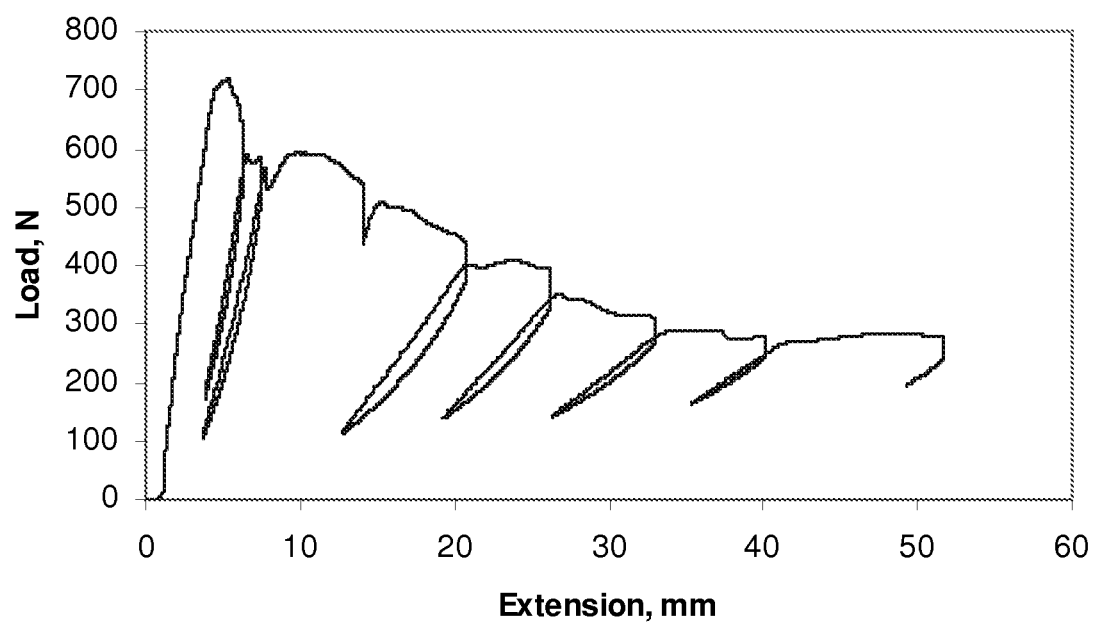
FIG. 4 is a plot of load versus extension data from a test of Interlaminar fracture toughness of a sample on PVC of a polyester amide polymer useful in the present invention.

$P$ = Load $\delta$ = displacement/extension $B$ = specimen width $a$ = crack length $\Delta$ = crack length correction Samples were loaded until the total crack length reached 100 mm. Two specimens were tested for each sample. Results are graphically illustrated in FIGS. 4 and 5. Estimated $G_{IC}$ values are shown in Table 6.

TABLE 6

G1C Averages (Avg) and standard deviations (StDev) for C2C-18 mole % y-units material bonded to cold rolled steel (CRS), polyvinyl chloride (PVC) and polycarbonate (PC)

| | Modified $G_{1C}$ N/m | |
|---|---|---|
| | Avg | StDev |
| | CRS | |
| Specimen 1 | 654 | 50.1 |
| Specimen 2 | — | — |
| | PVC | |
| Specimen 1 | 7192 | 1282.3 |
| Specimen 2 | 5693 | 1578.8 |
| | PC | |
| Specimen 1 | 6631 | 1909.1 |
| Specimen 2 | 8339 | 556.9 |

The data of Example 9 demonstrate that the PEAs useful in the present invention adhere to a variety of laminate substrates and thus are useful in preparing the laminate structures of the present invention.

While the invention has been described above according to its preferred embodiments, it can be modified within the spirit and scope of this disclosure. This application is therefore intended to cover any variations, uses, or adaptations of the invention using the general principles disclosed herein. Further, the application is intended to cover such departures from the present disclosure as come within the known or customary practice in the art to which this invention pertains and which fall within the limits of the following claims.

What is claimed is:

1. A laminate structure comprising two or more sheets of glass and an adhesive polymer disposed between the sheets of glass, wherein the adhesive polymer comprises a poly(ester amide) that is a self assembling material; wherein the poly(ester amide) has the formula:

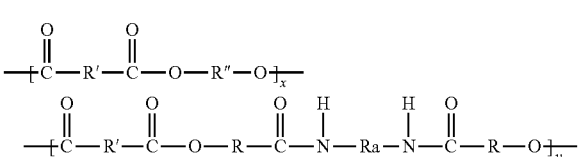

wherein paired brackets contain respective x and y repeat units, wherein each x and y independently is an integer of 1 or higher that represents the number of one of the respective x and y repeat units;

R is independently in each occurrence an aliphatic or heteroaliphatic, alicyclic or heteroalicyclic or aromatic or heteroaromatic group;

R' is a $C_2$-$C_{12}$ alkylene;

R" is an aliphatic or heteroaliphatic, alicyclic or heteroalicyclic or aromatic or heteroaromatic group; and Ra is a bond or is an aliphatic or heteroaliphatic, alicyclic or heteroalicyclic or aromatic or heteroaromatic group; or $$-\!\!\left[\text{O}-\text{R}''-\text{O}-\overset{\overset{\text{O}}{\|}}{\text{C}}-\text{R}'-\overset{\overset{\text{O}}{\|}}{\text{C}}\right]_x\!\!-$$

$$-\!\!\left[\text{O}-\text{R}-\text{O}-\overset{\overset{\text{O}}{\|}}{\text{C}}-\text{R}-\overset{\overset{\text{O}}{\|}}{\underset{\underset{\text{H}}{|}}{\text{C}}}-\text{N}-\text{Ra}-\text{N}-\overset{\overset{\text{H}}{|}}{\underset{\underset{\text{O}}{\|}}{\text{C}}}-\text{R}-\text{O}\right]_y\!\!-$$

wherein paired brackets contain respective x and y repeat units, wherein each x and y independently is an integer of 1 or higher that represents the number of one of the respective x and y repeat units;

R is independently in each occurrence an aliphatic or heteroaliphatic, alicyclic or heteroalicyclic or aromatic or heteroaromatic group;

R' is a bond or a $C_2$-$C_{12}$ alkylene group;

R" is an aliphatic or heteroaliphatic, alicyclic or heteroalicyclic or aromatic or heteroaromatic group; and Ra is a bond or is an aliphatic or heteroaliphatic, alicyclic or heteroalicyclic or aromatic or heteroaromatic group; wherein the number average molecular weight of the adhesive polymer is between 8,000 and 20,000 g/mol.

2. The laminate structure according to claim 1, wherein the poly(ester amide) is of the formula:

$$-\!\!\left[\overset{\overset{\text{O}}{\|}}{\text{C}}-\text{R}'-\overset{\overset{\text{O}}{\|}}{\text{C}}-\text{O}-\text{R}''-\text{O}\right]_x\!\!\left[\overset{\overset{\text{O}}{\|}}{\text{C}}-\text{R}'-\overset{\overset{\text{O}}{\|}}{\text{C}}-\text{O}-\text{R}-\text{O}-\overset{\overset{\text{O}}{\|}}{\underset{\underset{\text{H}}{|}}{\text{C}}}-\text{N}-\text{Ra}-\text{N}-\overset{\overset{\text{H}}{|}}{\underset{\underset{\text{O}}{\|}}{\text{C}}}-\text{O}-\text{R}-\text{O}\right]_y\!\!-$$

wherein paired brackets contain respective x and y repeat units, wherein each x and y independently is an integer of 1 or higher that represents the number of one of the respective x and y repeat units;

R is independently in each occurrence an aliphatic or heteroaliphatic, alicyclic or heteroalicyclic or aromatic or heteroaromatic group;

R' is a $C_2$-$C_{12}$ alkylene group;

R" is an aliphatic or heteroaliphatic, alicyclic or heteroalicyclic or aromatic or heteroaromatic group; and Ra is a bond or is an aliphatic or heteroaliphatic, alicyclic or heteroalicyclic or aromatic or heteroaromatic group.

3. The laminate structure according to claim 2 wherein the poly(ester amide) is of the formula:

$$-\!\!\left[\overset{\overset{\text{O}}{\|}}{\text{C}}-(\text{CH}_2)_q-\overset{\overset{\text{O}}{\|}}{\text{C}}-\text{O}(\text{CH}_2)_r\text{O}\right]_x\!\!\left[\overset{\overset{\text{O}}{\|}}{\text{C}}-(\text{CH}_2)_q-\overset{\overset{\text{O}}{\|}}{\text{C}}-\text{O}(\text{CH}_2)_p\overset{\overset{\text{O}}{\|}}{\underset{\underset{\text{H}}{|}}{\text{C}}}\text{N}(\text{CH}_2)_n\overset{\overset{\text{H}}{|}}{\underset{\underset{\text{O}}{\|}}{\text{N}}}\text{C}(\text{CH}_2)_p\text{O}\right]_y\!\!-$$

wherein p, q, and r are independently 2, 3, 4, 5, 6, 7, or 8; and n is an integer of 2-6.

4. The laminate structure according to claim 3 wherein the poly(ester amide) is of the formula $$-\!\!\left[\overset{\overset{\text{O}}{\|}}{\text{C}}-(\text{CH}_2)_4-\overset{\overset{\text{O}}{\|}}{\text{C}}-\text{O}-(\text{CH}_2)_4-\text{O}\right]_x\!\!\left[\overset{\overset{\text{O}}{\|}}{\text{C}}-(\text{CH}_2)_4-\overset{\overset{\text{O}}{\|}}{\text{C}}-\text{O}-(\text{CH}_2)_5-\overset{\overset{\text{O}}{\|}}{\underset{\underset{\text{H}}{|}}{\text{C}}}-\text{N}-(\text{CH}_2)_2-\overset{\overset{\text{H}}{|}}{\underset{\underset{\text{O}}{\|}}{\text{N}}}-\text{C}-(\text{CH}_2)_5\text{O}\right]_y\!\!-\ .$$

5. The laminate structure according to claim 3, wherein p, q, and r are independently 2, 4, 5, or 6.

6. The laminate structure according to claim 1, wherein the poly(ester amide) is of the formula:

$$-\!\!\left[\text{O}-\text{R}''-\text{O}-\overset{\overset{\text{O}}{\|}}{\text{C}}-\text{R}'-\overset{\overset{\text{O}}{\|}}{\text{C}}\right]_x\!\!\left[\text{O}-\text{R}-\text{O}-\overset{\overset{\text{O}}{\|}}{\text{C}}-\text{R}-\overset{\overset{\text{O}}{\|}}{\underset{\underset{\text{H}}{|}}{\text{C}}}-\text{N}-\text{Ra}-\text{N}-\overset{\overset{\text{H}}{|}}{\underset{\underset{\text{O}}{\|}}{\text{C}}}-\text{R}-\text{O}\right]_y\!\!-$$

wherein
paired brackets contain respective x and y repeat units, wherein each x and y independently is an integer of 1 or higher that represents the number of one of the respective x and y repeat units;
R is independently in each occurrence an aliphatic or heteroaliphatic, alicyclic or heteroalicyclic or aromatic or heteroaromatic group;
R' is a bond or a $C_2$-$C_{12}$ alkylene group;
R" is an aliphatic or heteroaliphatic, alicyclic or heteroalicyclic or aromatic or heteroaromatic group; and
Ra is a bond or is an aliphatic or heteroaliphatic, alicyclic or heteroalicyclic or aromatic or heteroaromatic group.

7. An article comprising the laminate structure according to claim 1.

8. The article according to claim 7, wherein the laminate structure comprises a vehicle windshield, a window, a synthetic glazing system, a display, a display case, a window system, an automotive interior system, or a home appliance assembly.

9. The laminate structure of claim 1, wherein the adhesive polymer comprises the poly(ester amide) that is a self assembling material; wherein the poly(ester amide) has a statistical distribution of repeat units.

10. The laminate structure of claim 1, wherein there are at least 70 moles of x units for each 30 moles of y units.

11. A laminate structure consisting of one sheet of glass and an adhesive polymer, the sheet of glass having a surface and the adhesive polymer coating a substantial portion of the surface of the sheet of glass, wherein the adhesive polymer comprises a poly(ester amide) that is a self assembling material; wherein the poly(ester amide) has the formula:

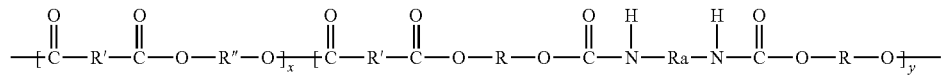

wherein
paired brackets contain respective x and y repeat units, wherein each x and y independently is an integer of 1 or higher that represents the number of one of the respective x and y repeat units;
R is independently in each occurrence an aliphatic or heteroaliphatic, alicyclic or heteroalicyclic or aromatic or heteroaromatic group;
R' is a $C_2$-$C_{12}$ alkylene group;
R" is an aliphatic or heteroaliphatic, alicyclic or heteroalicyclic or aromatic or heteroaromatic group; and
Ra is a bond or is an aliphatic or heteroaliphatic, alicyclic or heteroalicyclic or aromatic or heteroaromatic group;
or

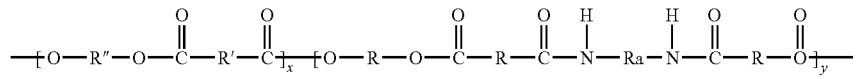

wherein
paired brackets contain respective x and y repeat units, wherein each x and y independently is an integer of 1 or higher that represents the number of one of the respective x and y repeat units;
R is independently in each occurrence an aliphatic or heteroaliphatic, alicyclic or heteroalicyclic or aromatic or heteroaromatic group;
R' is a bond or a $C_2$-$C_{12}$ alkylene group;
R" is an aliphatic or heteroaliphatic, alicyclic or heteroalicyclic or aromatic or heteroaromatic group; and
Ra is a bond or is an aliphatic or heteroaliphatic, alicyclic or heteroalicyclic or aromatic or heteroaromatic group; wherein the number average molecular weight of the adhesive polymer is between 8,000 and 20,000 g/mol.

12. The laminate structure of claim 11, wherein the poly(ester amide) has a statistical distribution of repeat units.

13. The laminate structure according to claim 11 wherein the poly(ester amide) is of the formula:

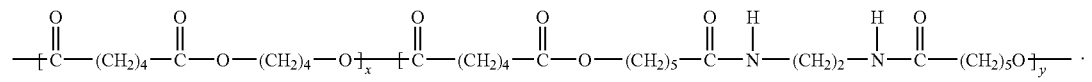
14. The laminate structure of claim 11, wherein there are at least 70 moles of x units for each 30 moles of y units.
\* \* \* \* \*